US008150185B2

(12) United States Patent
Ishida

(10) Patent No.: US 8,150,185 B2
(45) Date of Patent: Apr. 3, 2012

(54) IMAGE PROCESSING FOR GENERATING A THIN LINE BINARY IMAGE AND EXTRACTING VECTORS

(75) Inventor: Yoshihiro Ishida, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 781 days.

(21) Appl. No.: 12/265,459

(22) Filed: Nov. 5, 2008

(65) Prior Publication Data
US 2009/0115867 A1   May 7, 2009

(30) Foreign Application Priority Data
Nov. 7, 2007   (JP) ................................ 2007-289962

(51) Int. Cl.
*G06K 9/36*   (2006.01)
(52) U.S. Cl. ....................................................... 382/242
(58) Field of Classification Search ................... 382/242
See application file for complete search history.

(56) References Cited

U.S. PATENT DOCUMENTS

| 4,020,463 | A | * | 4/1977 | Himmel ......................... 382/242 |
| 4,093,941 | A | * | 6/1978 | Bryan et al. ................... 382/197 |
| 4,777,651 | A | * | 10/1988 | McCann et al. ............... 382/242 |
| 4,827,330 | A | * | 5/1989 | Walsh et al. ................... 358/452 |
| 4,961,231 | A | * | 10/1990 | Nakayama et al. ............ 382/197 |
| 5,317,417 | A | * | 5/1994 | Yamamura et al. ........... 382/194 |
| 5,357,602 | A | * | 10/1994 | Ohta .............................. 345/442 |
| 5,515,179 | A | | 5/1996 | Yamakawa |
| 5,561,534 | A | * | 10/1996 | Ishida et al. ................... 358/448 |
| 5,812,250 | A | | 9/1998 | Ishida |
| 5,878,161 | A | * | 3/1999 | Ishida et al. ................... 382/198 |
| 5,978,520 | A | * | 11/1999 | Maruyama et al. ............ 382/294 |
| 5,987,173 | A | * | 11/1999 | Kohno et al. .................. 382/199 |
| 6,111,994 | A | * | 8/2000 | Katayama et al. ............. 382/298 |
| 6,404,921 | B1 | | 6/2002 | Ishida |
| 6,406,111 | B1 | * | 6/2002 | Klassen et al. ..................... 347/9 |
| 6,862,369 | B2 | * | 3/2005 | Kondo ........................... 382/199 |

(Continued)

FOREIGN PATENT DOCUMENTS
JP   3026592   5/1992

(Continued)

OTHER PUBLICATIONS

Koichi Sakai, "Basics and Application of Digital Image Processing", second edition, CQ Publishing, issued Feb. 1, 2004, pp. 51-54.

*Primary Examiner* — Wenpeng Chen
(74) *Attorney, Agent, or Firm* — Fitzpatrick, Cella, Harper & Scinto

(57) ABSTRACT

An image processing apparatus generating a thin line binary image and extracting vectors includes: a vector extracting unit configured to raster-scan the thin line binary image by using a pixel matrix including a plurality of pixels to extract a vector to which contour point information is added in accordance with a predetermined pattern of black and white pixels in the pixel matrix; and a coordinate correcting unit configured to detect that the vector has been extracted from a set of black pixels in 2 pixels×2 pixels in the pixel matrix by referring to the contour point information added to the vector and correct a coordinate of a core-line vector in accordance with coordinate correction information included in the contour point information, the core-line vector being produced by reducing the vector to a core line.

7 Claims, 39 Drawing Sheets

U.S. PATENT DOCUMENTS

| | | | |
|---|---|---|---|
| 7,221,779 B2 * | 5/2007 | Kawakami et al. | 382/107 |
| 7,889,938 B2 * | 2/2011 | Ishida | 382/242 |
| 2005/0238244 A1 | 10/2005 | Uzawa | |
| 2005/0259882 A1 * | 11/2005 | Dewaele | 382/243 |
| 2007/0230809 A1 * | 10/2007 | Ishida | 382/242 |
| 2008/0037834 A1 * | 2/2008 | Abe | 382/115 |
| 2008/0137961 A1 * | 6/2008 | Ishida et al. | 382/197 |

FOREIGN PATENT DOCUMENTS

| | | |
|---|---|---|
| JP | 2005-346137 | 12/2005 |
| JP | 2008-146496 | 6/2008 |

* cited by examiner

F I G. 3
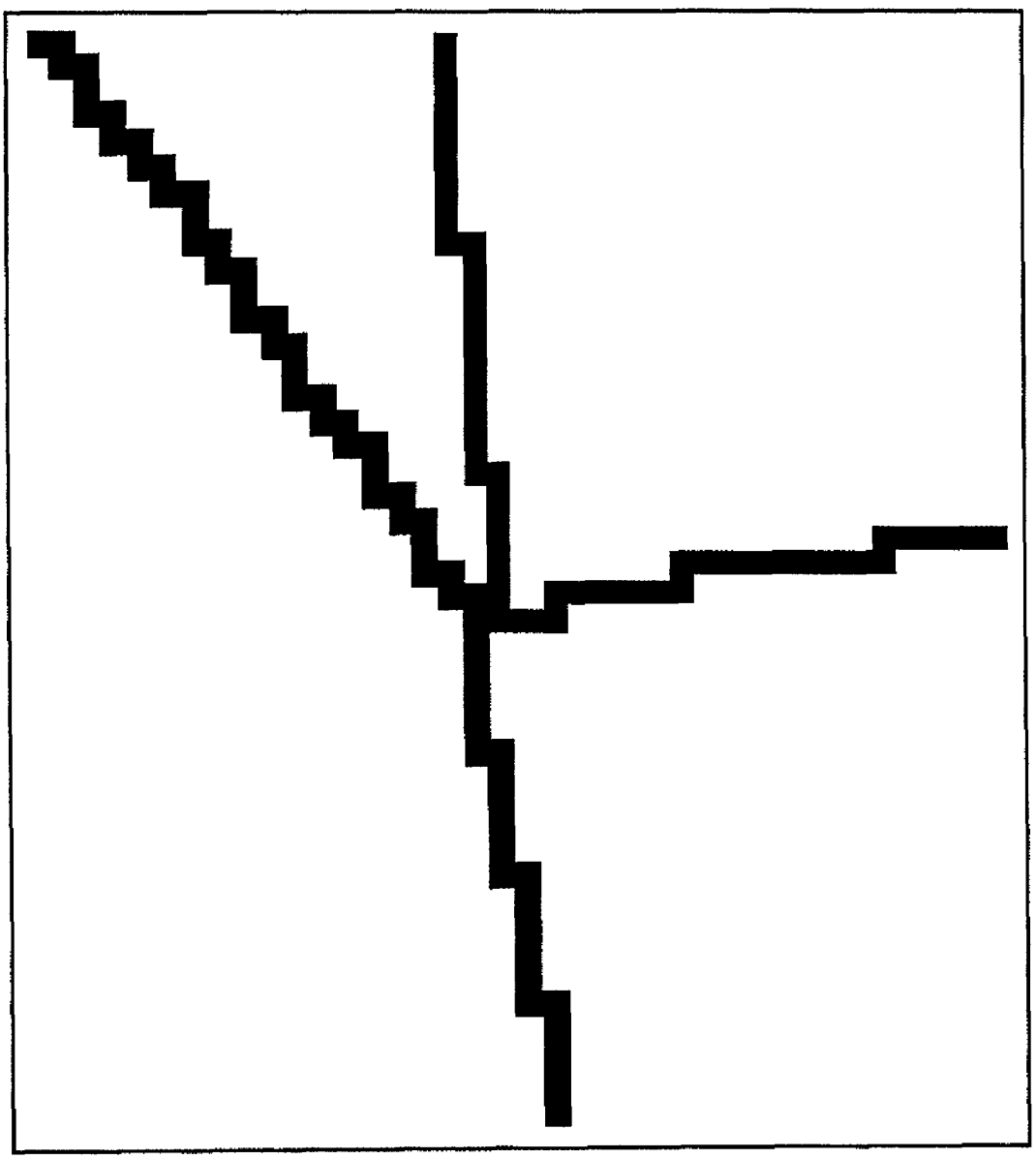

FIG. 10A

| No. | CONTOUR POINT INFORMATION | ENDPOINT INFORMATION | VALUE | HORI-ZONTAL :0 VERTICAL :1 | UPWARD :0 DOWN-WARD :1 | RIGHT-WARD :0 LEFT-WARD :1 | UN-SELECTED :0 SELECTED :1 | ENDPOINT :1 NON-ENDPOINT :0 | DIRECTION OF CORRECTION NO CORRECTION :000 UPPER LEFT :001 LOWER LEFT :010 UPPER RIGHT :011 LOWER RIGHT :100 |
|---|---|---|---|---|---|---|---|---|---|
| 01. | UP_RIGHT_TL | Top Left | 08H | 0 | 0 | 0 | 0 | 1 | 000 |
| 02. | UP_RIGHT_TL_4 | Top Left | 0CH | 0 | 0 | 0 | 0 | 1 | 100 |
| 03. | UP_RIGHT_TL_2 | Top Left | 0AH | 0 | 0 | 0 | 0 | 1 | 010 |
| 04. | UP_RIGHT | | 10H | 0 | 0 | 0 | 1 | 0 | 000 |
| 05. | UP_RIGHT_LT | Left Top | 18H | 0 | 0 | 0 | 1 | 1 | 000 |
| 06. | UP_RIGHT_LT_4 | Left Top | 1CH | 0 | 0 | 0 | 1 | 1 | 100 |
| 07. | UP_RIGHT_LT_3 | Left Top | 1BH | 0 | 0 | 0 | 1 | 1 | 011 |
| 08. | UP_LEFT | | 30H | 0 | 0 | 1 | 1 | 0 | 000 |
| 09. | DOWN_RIGHT | | 50H | 0 | 1 | 0 | 1 | 0 | 000 |
| 10. | DOWN_LEFT_BR | Bottom Right | 68H | 0 | 1 | 1 | 0 | 1 | 000 |
| 11. | DOWN_LEFT_BR_3 | Bottom Right | 6BH | 0 | 1 | 1 | 0 | 1 | 011 |
| 12. | DOWN_LEFT_BR_1 | Bottom Right | 69H | 0 | 1 | 1 | 0 | 1 | 001 |
| 13. | DOWN_LEFT | | 70H | 0 | 1 | 1 | 1 | 0 | 000 |

FIG. 10B

|  | Name | Code |  |  |  |  |  |  |
|---|---|---|---|---|---|---|---|---|
| 14. | DOWN_LEFT_RB | 78H | 0 | 1 | 1 | 1 | 1 | 000 |
| 15. | DOWN_LEFT_RB_2 | 7AH | 0 | 1 | 1 | 1 | 1 | 010 |
| 16. | DOWN_LEFT_RB_1 | 79H | 0 | 1 | 1 | 1 | 1 | 001 |
| 17. | RIGHT_UP | 90H | 1 | 0 | 0 | 1 | 0 | 000 |
| 18. | LEFT_UP_LB | A8H | 1 | 0 | 1 | 0 | 1 | 000 |
| 19. | LEFT_UP_LB_4 | ACH | 1 | 0 | 1 | 1 | 0 | 100 |
| 20. | LEFT_UP_LB_3 | ABH | 1 | 0 | 1 | 0 | 1 | 011 |
| 21. | LEFT_UP | B0H | 1 | 0 | 1 | 1 | 0 | 000 |
| 22. | LEFT_UP_BL | B8H | 1 | 0 | 1 | 1 | 1 | 000 |
| 23. | LEFT_UP_BL_3 | BBH | 1 | 0 | 1 | 1 | 1 | 011 |
| 24. | LEFT_UP_BL_1 | B9H | 1 | 0 | 1 | 1 | 1 | 001 |
| 25. | RIGHT_DOWN_RT | C8H | 1 | 1 | 0 | 0 | 1 | 000 |
| 26. | RIGHT_DOWN_RT_2 | CAH | 1 | 1 | 0 | 0 | 1 | 010 |
| 27. | RIGHT_DOWN_RT_1 | C9H | 1 | 1 | 0 | 0 | 1 | 001 |
| 28. | RIGHT_DOWN | D0H | 1 | 1 | 0 | 1 | 1 | 000 |
| 29. | RIGHT_DOWN_TR | D8H | 1 | 1 | 1 | 1 | 1 | 000 |
| 30. | RIGHT_DOWN_TR_4 | DCH | 1 | 1 | 1 | 1 | 1 | 100 |
| 31. | RIGHT_DOWN_TR_2 | DAH | 1 | 1 | 1 | 1 | 1 | 010 |
| 32. | LEFT_DOWN | F0H | 1 | 1 | 1 | 0 | 0 | 000 |

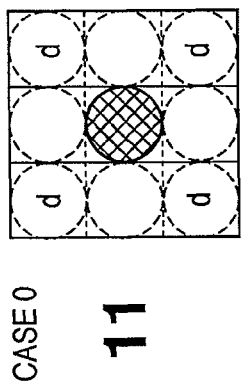
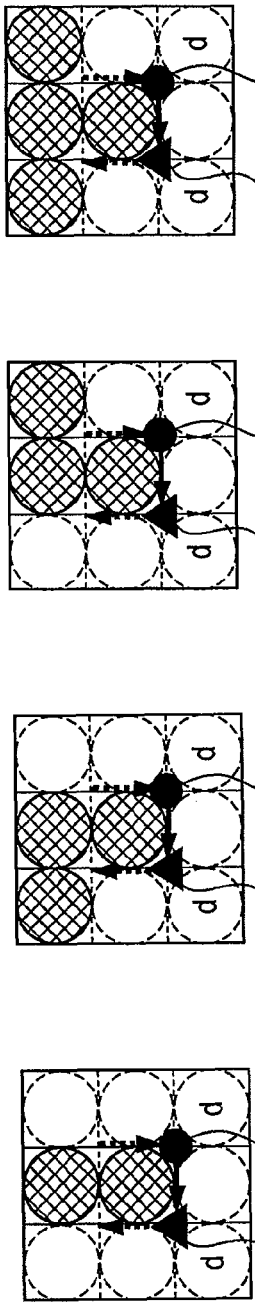
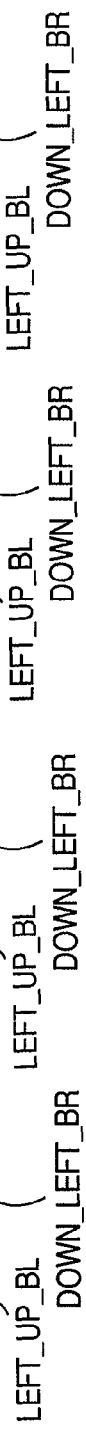
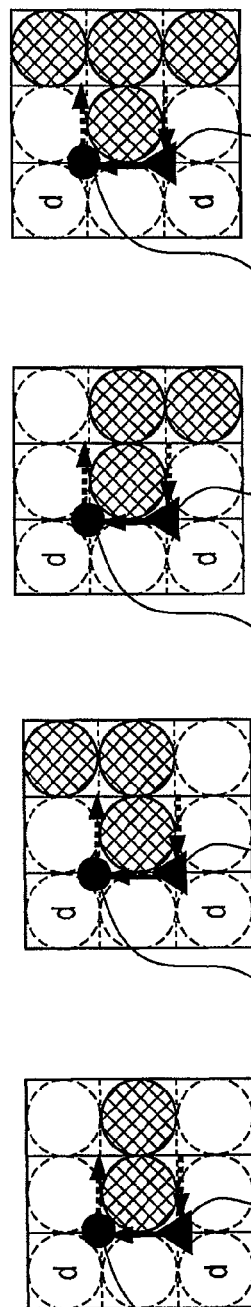
CASE 0
FIG. 11
CASE 1
FIG. 12A   FIG. 12B   FIG. 12C   FIG. 12D
CASE 2
FIG. 13A   FIG. 13B   FIG. 13C   FIG. 13D

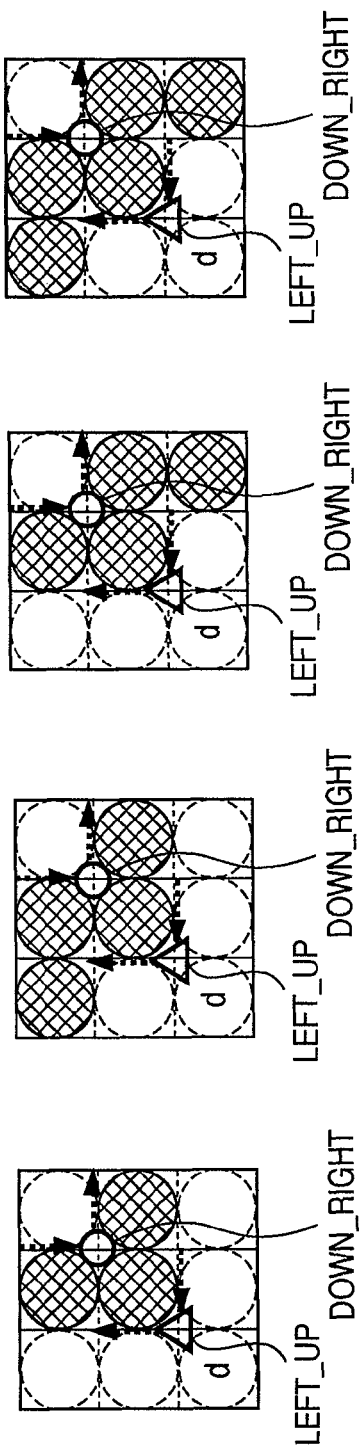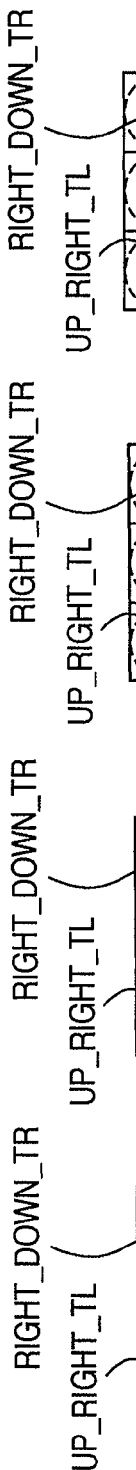

CASE 5
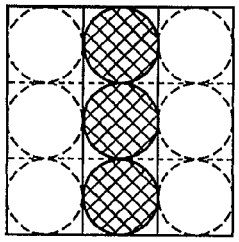 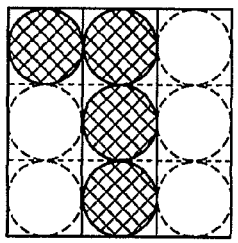 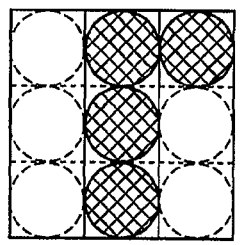 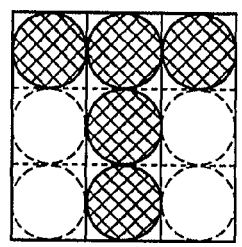
FIG. 16A  FIG. 16B  FIG. 16C  FIG. 16D
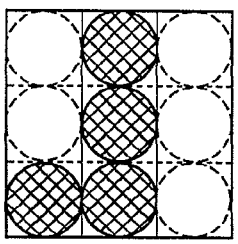 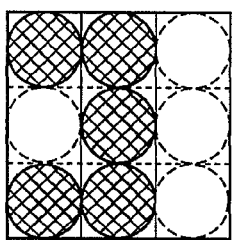 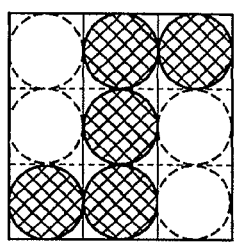 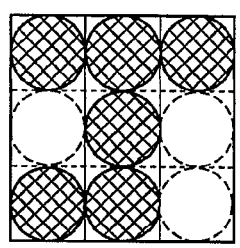
FIG. 16E  FIG. 16F  FIG. 16G  FIG. 16H
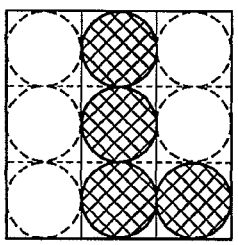 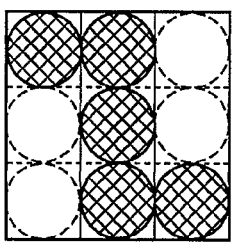 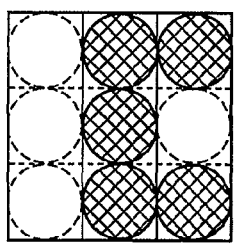 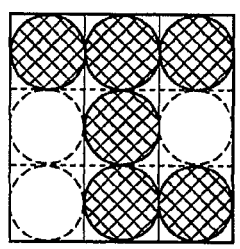
FIG. 16I  FIG. 16J  FIG. 16K  FIG. 16L
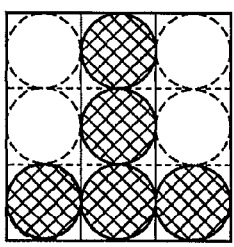 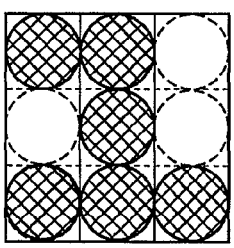 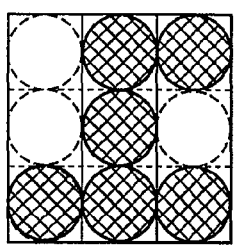 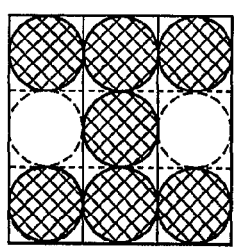
FIG. 16M  FIG. 16N  FIG. 16O  FIG. 16P

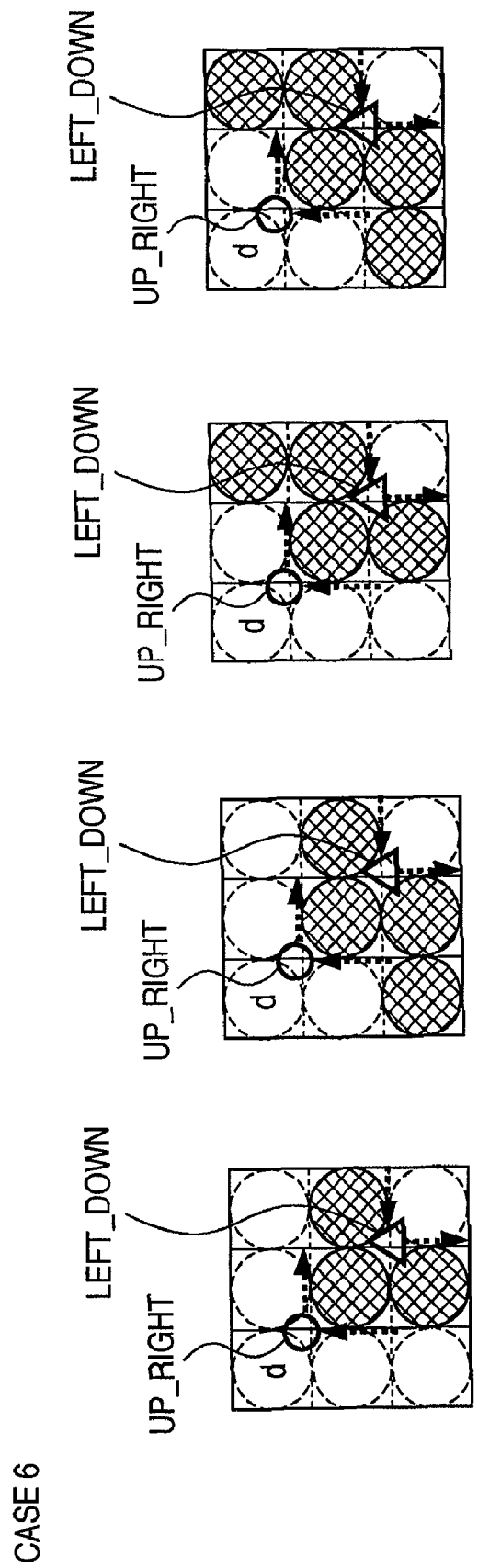

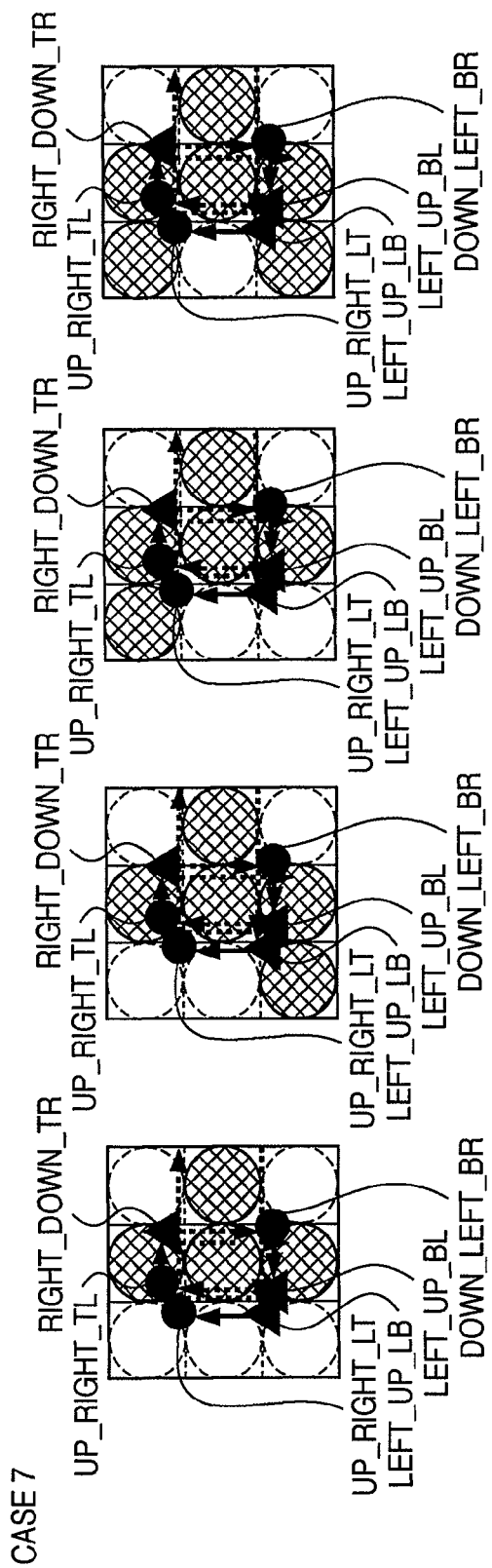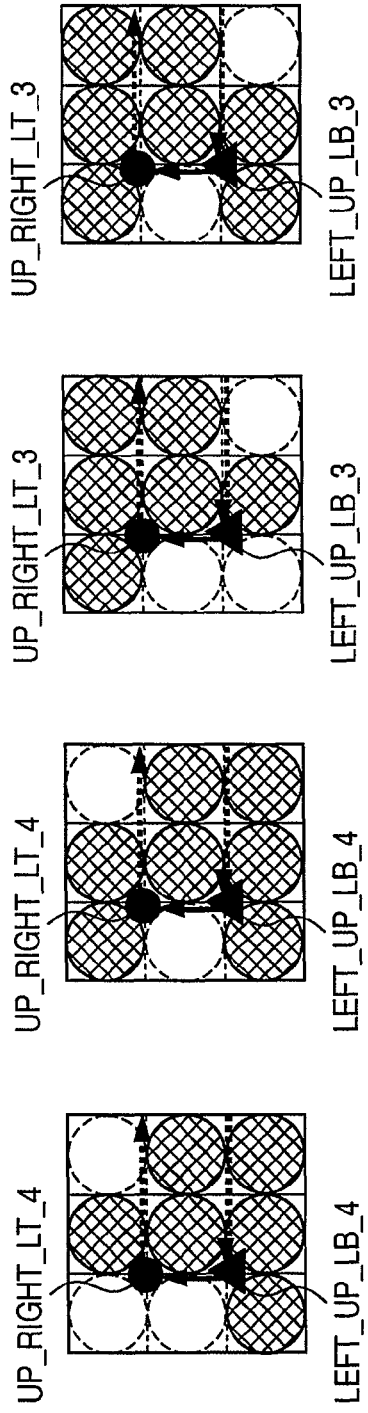

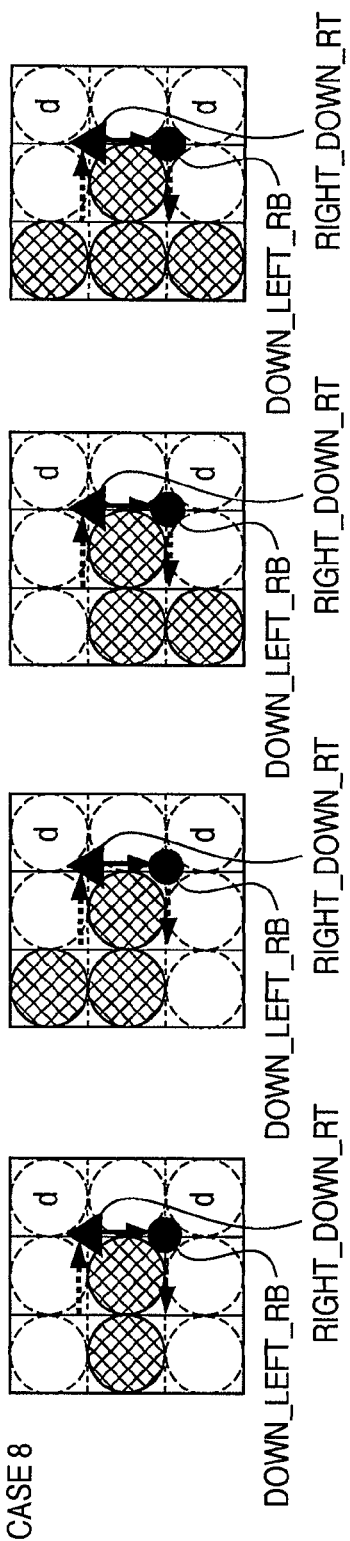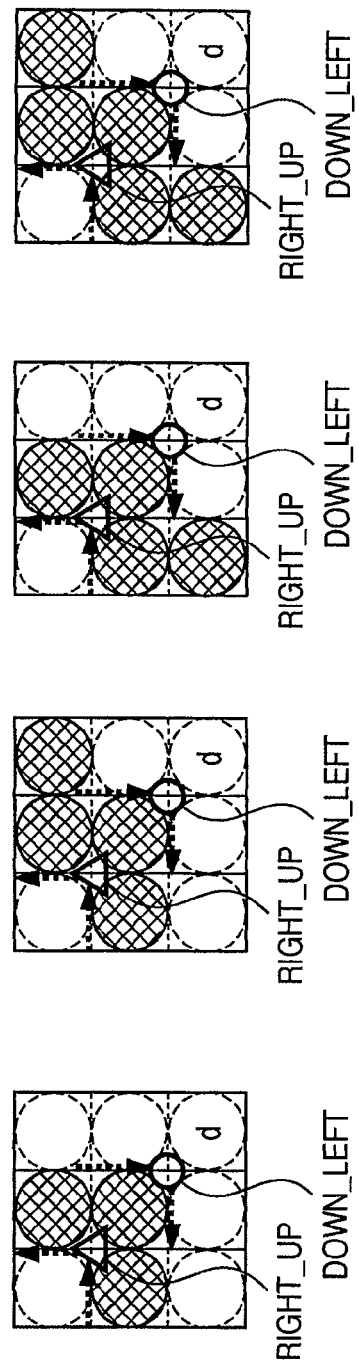

CASE 10
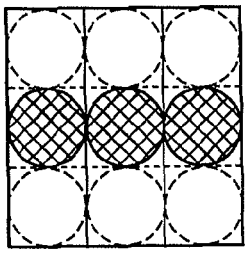 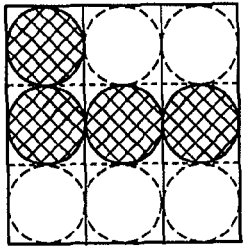 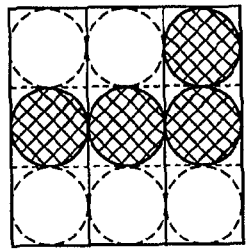 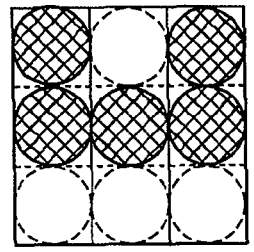
FIG. 21A FIG. 21B FIG. 21C FIG. 21D
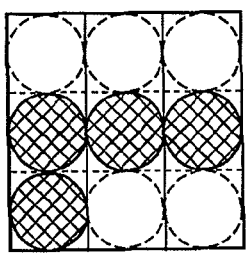 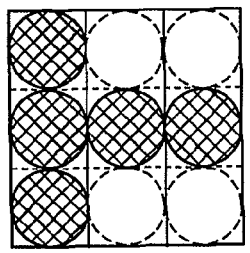 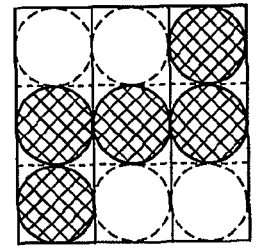 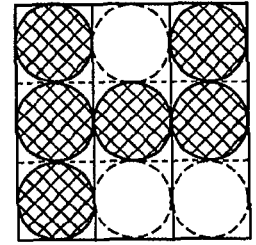
FIG. 21E FIG. 21F FIG. 21G FIG. 21H
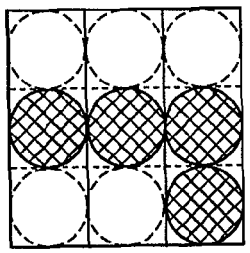 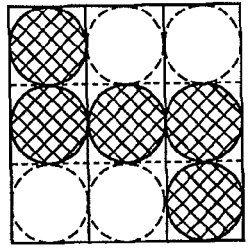 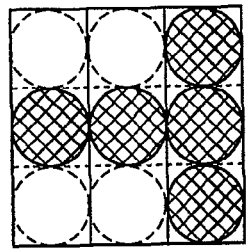 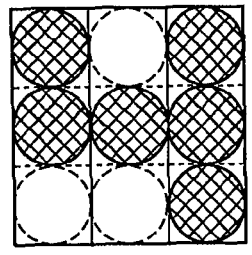
FIG. 21I FIG. 21J FIG. 21K FIG. 21L
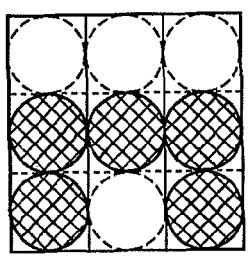 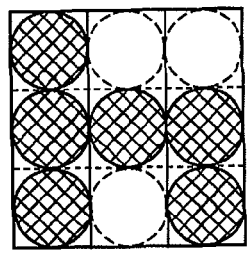 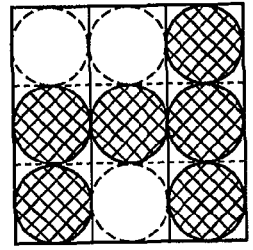 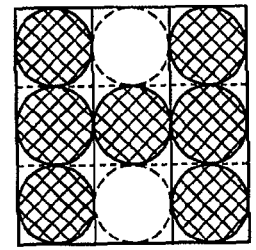
FIG. 21M FIG. 21N FIG. 21O FIG. 21P

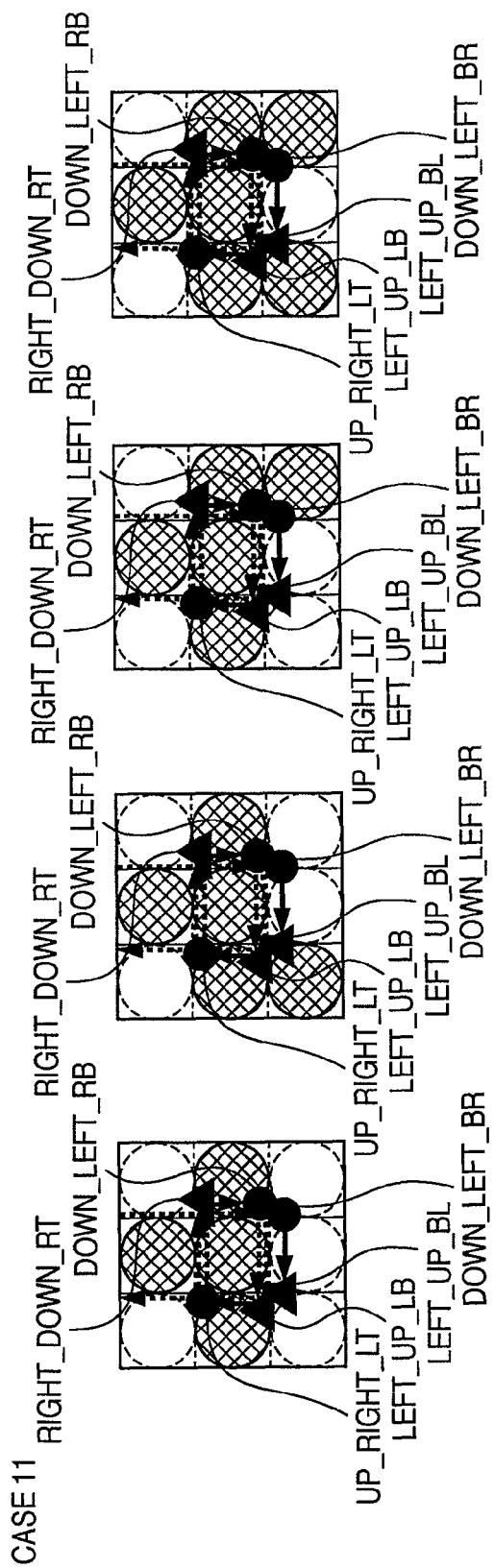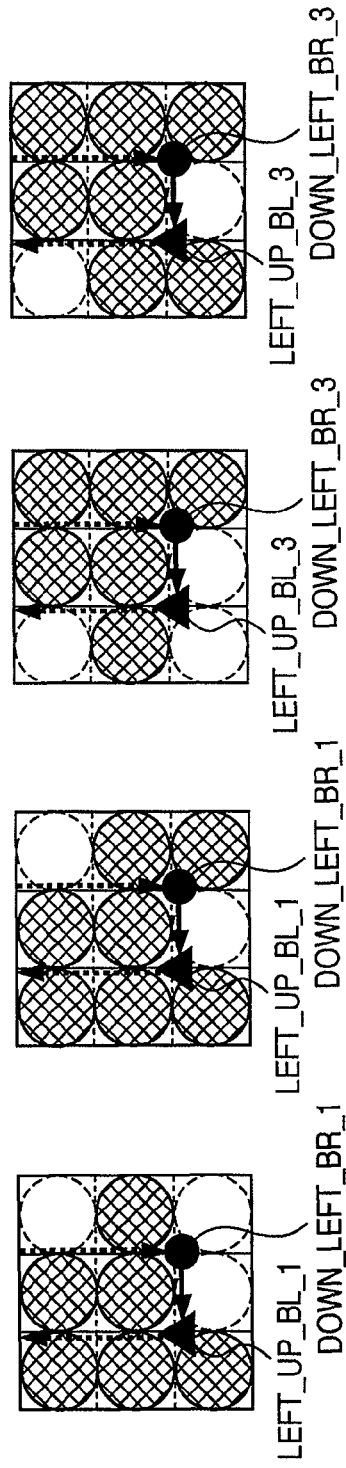

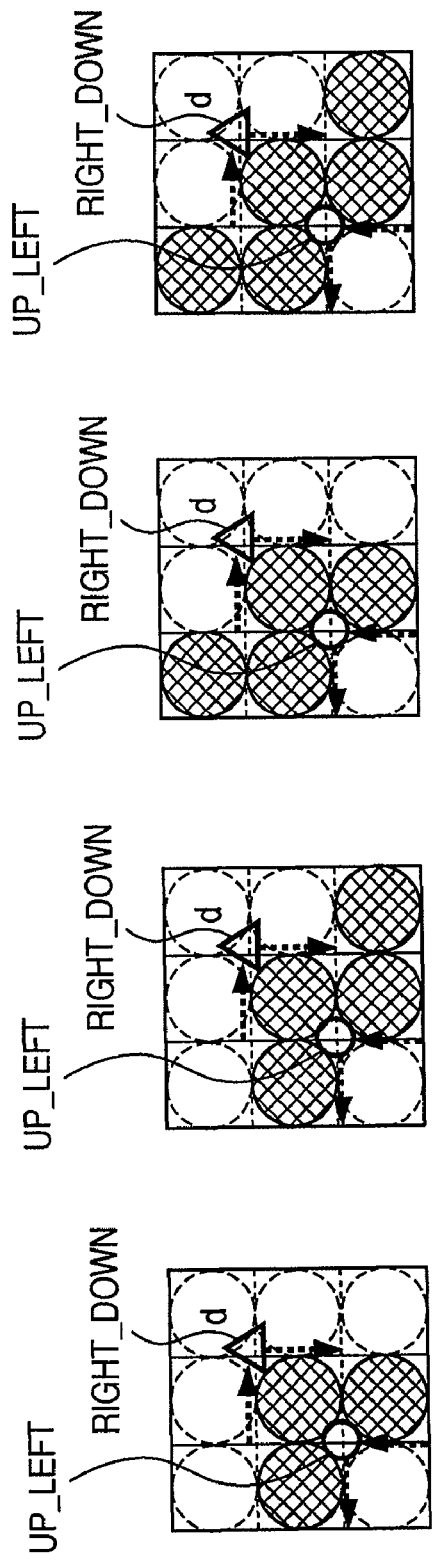

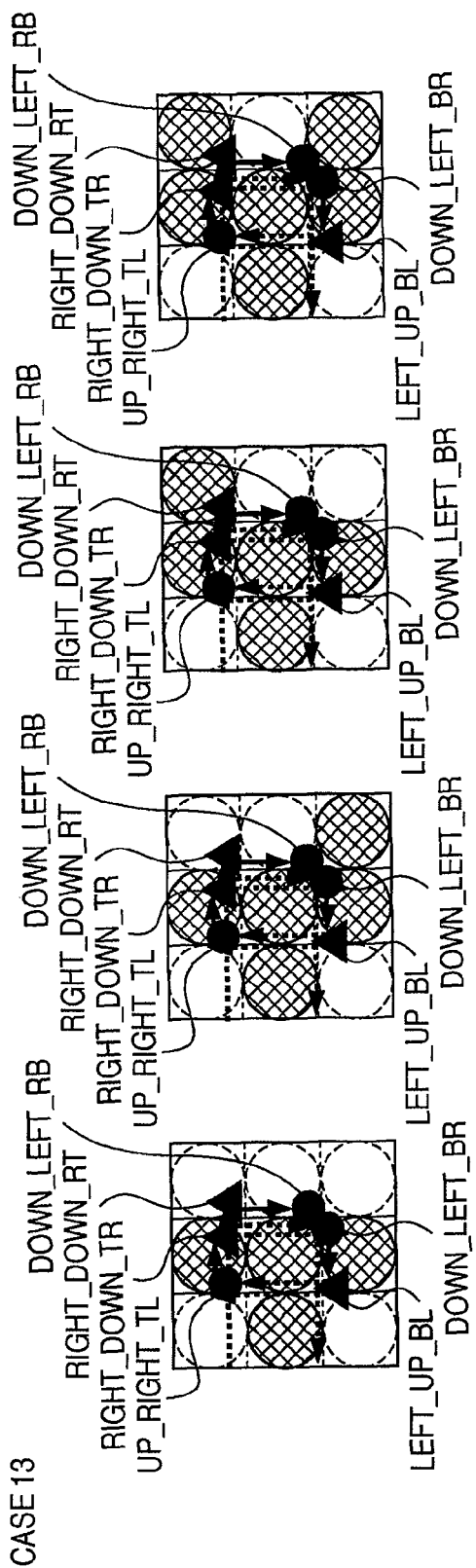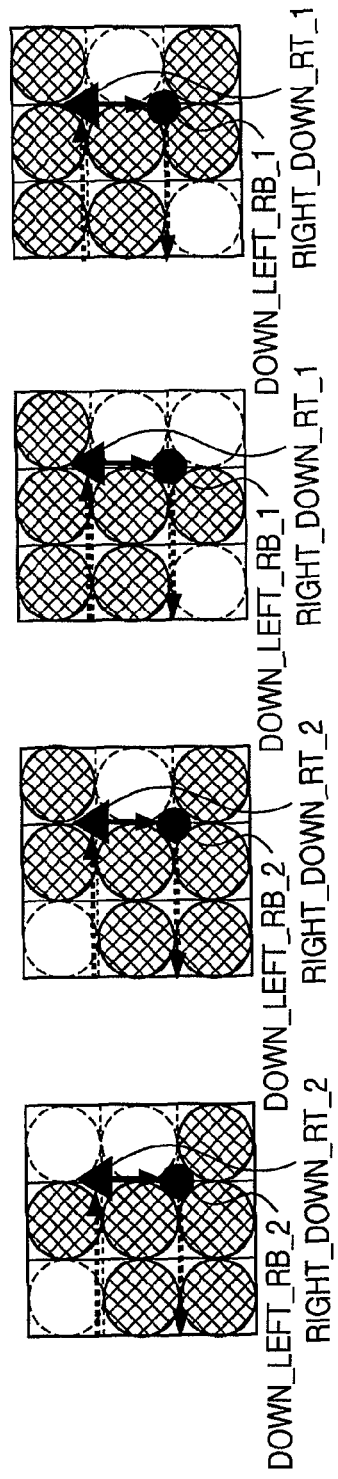
FIG. 24A  FIG. 24B  FIG. 24C  FIG. 24D
FIG. 24E  FIG. 24F  FIG. 24G  FIG. 24H

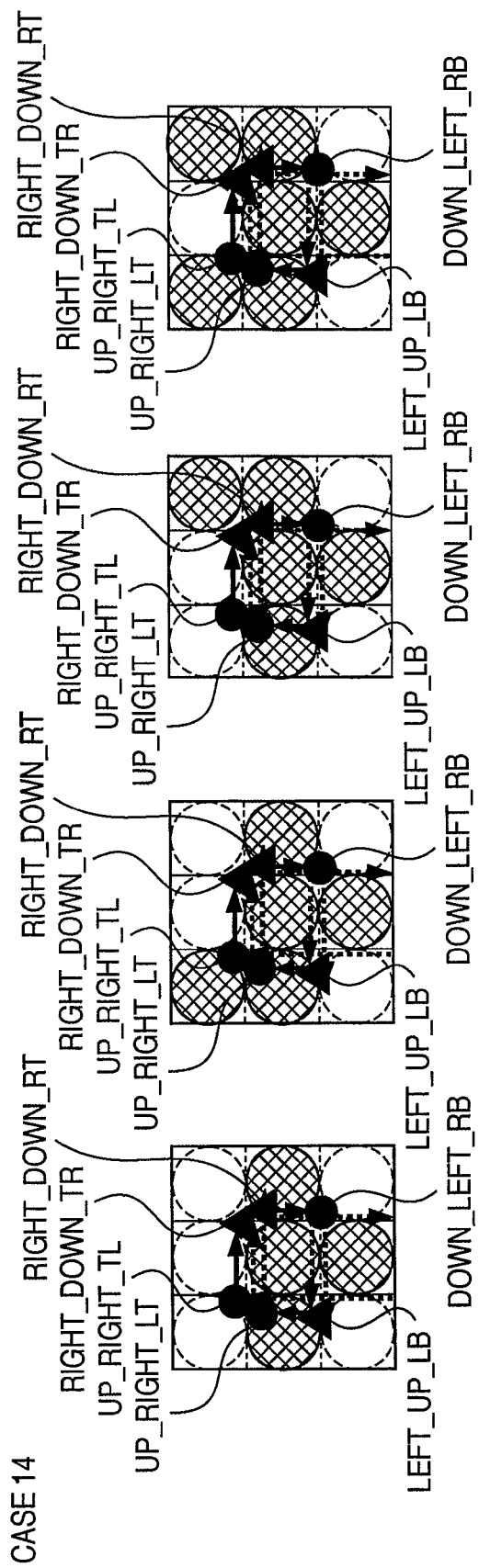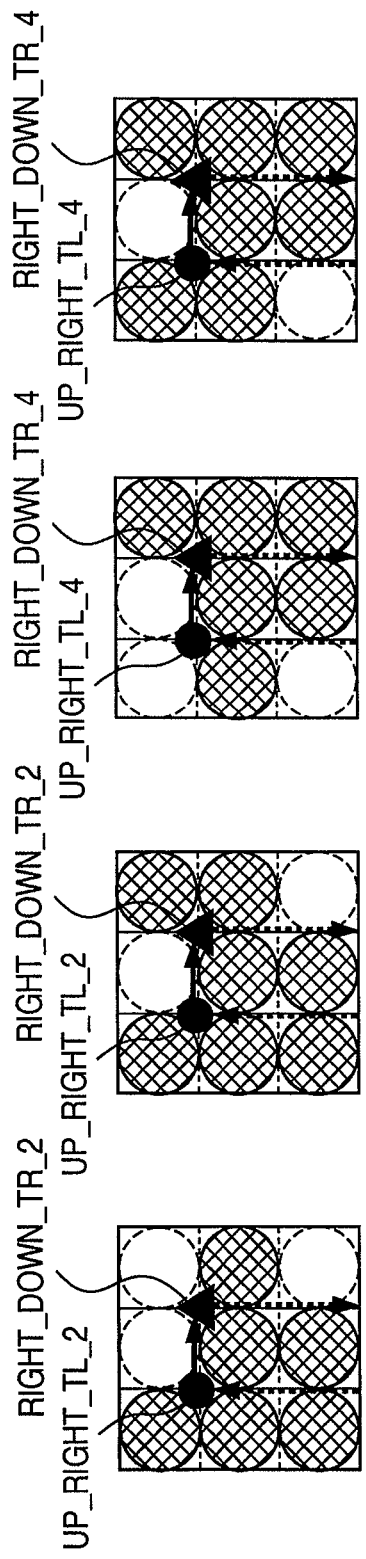

CASE 15

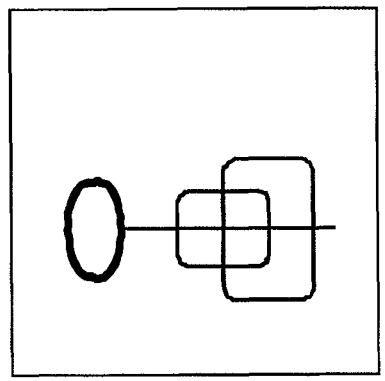

INPUT BINARY IMAGE (LINE ART)

FIG. 39A

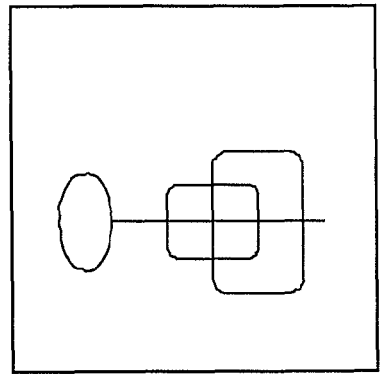

(Hilditch) THINNED IMAGE

FIG. 39B

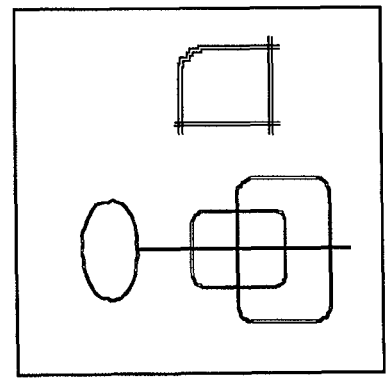

RESULT OF ENDPOINT
(INTERSECTION POINT) DETECTION
AND ENDPOINT-TO-ENDPOINT
LINEAR ELEMENT (SURROUND)
VECTOR EXTRACTION

FIG. 39C

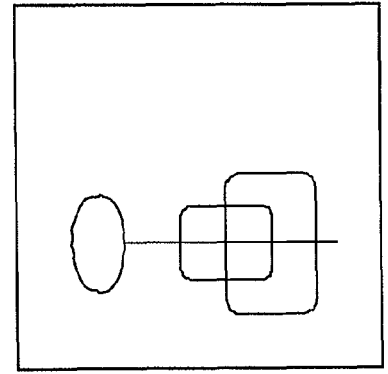

ENDPOINT-(INTERSECTION
POINT)-TO-ENDPOINT
LINEAR ELEMENT CORE LINE
(SURROUND) VECTORS

FIG. 39D

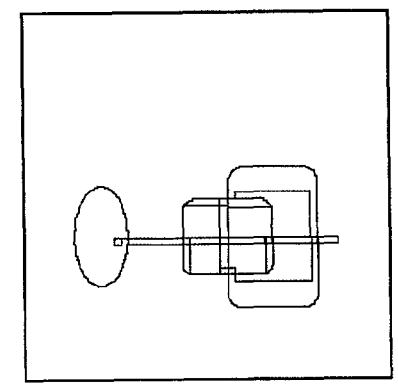

LINEAR ELEMENT CORE LINE
(SURROUND) VECTORS INCLUDING
AUXILIARY VECTORS

FIG. 39E

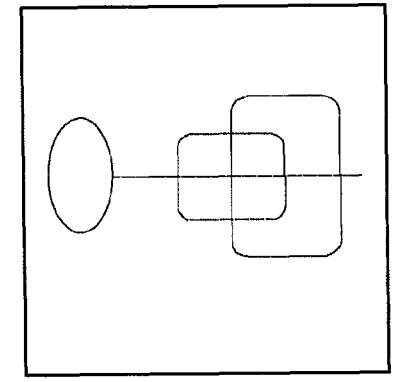

ENDPOINT-(INTERSECTION
POINT)-TO-ENDPOINT LINEAR
ELEMENT SMOOTHED
(FUNCTION-APPROXIMATED) VECTORS

FIG. 39F

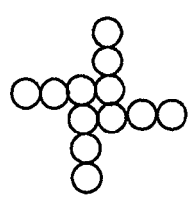
F I G. 40A
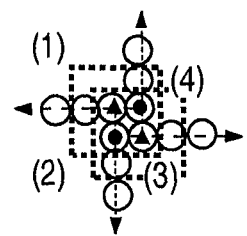
F I G. 40B
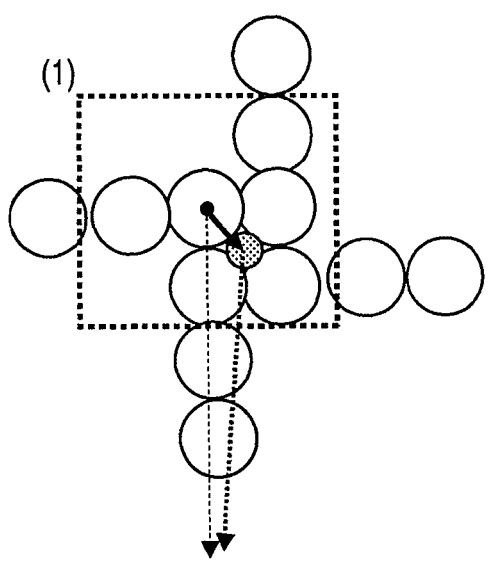
F I G. 40C
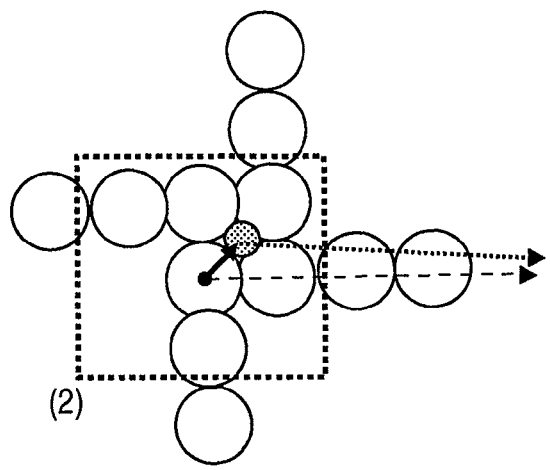
F I G. 40D
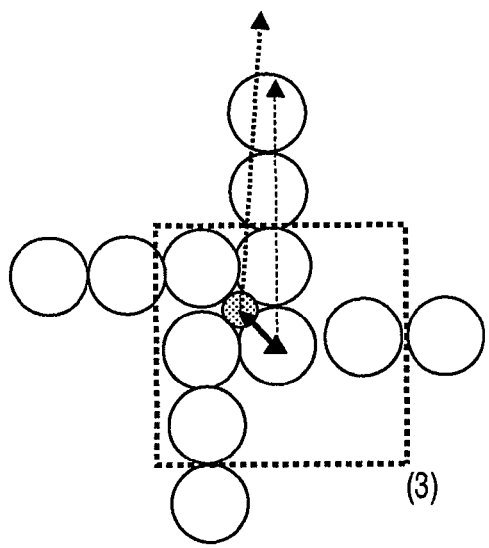
F I G. 40E
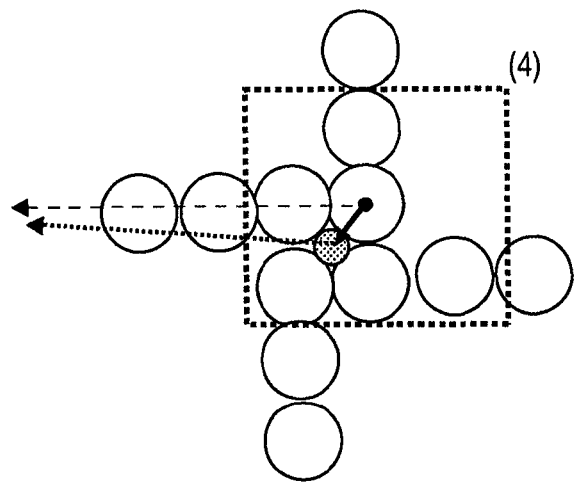
F I G. 40F

IMAGE PROCESSING FOR GENERATING A THIN LINE BINARY IMAGE AND EXTRACTING VECTORS

BACKGROUND OF THE INVENTION

1. Field of the Invention

The present invention relates to an apparatus that extracts line-art vector information from a thinned binary image.

2. Description of the Related Art

There has been a growing demand for paperless environments and existing hardcopy image data are often converted to digital formats and reused in these days. In order to reuse image data, the image data is binarized, and then the binary image data is converted to vector data by using a vectorization technique. Then the vector data is used in applications such as CAD software. Various techniques concerning vectorization of image data have been developed.

Japanese Patent No. 3026592 discloses an image processing apparatus that extracts a group of independent vectors corresponding to line components of a binary graphic or line drawing which is a set of independent lines and closed curves that connect endpoints of lines and intersection points of lines constituting the binary graphic or line drawing from a thinned binary image in a single raster scan. According to Japanese Patent No. 3026592, all contours in the thinned binary image can be extracted in only one series of raster scanning and, since image memory for storing the whole image data is not required, the memory space can be saved. In addition, by extracting contours of edges of pixels of an input image, instead of center positions of the pixels, the contours can have a significant width for a single-pixel-wide thin line. Furthermore, it is described that not only a contour of a connected pixel region in an original image in which pixels are connected in four directions but also a contour of a pixel region in which pixels are connected in eight directions can be extracted. Japanese Patent Laid-Open No. 2005-346137 discloses a processing method and apparatus that provide function approximation of contour information representing a high-quality scaled-up or scaled-down image with a less amount of data by approximating not only straight lines in contour information in a binary image but also two- or three-dimensional Bezier curves.

Various techniques have also been developed for vectorizing such binary images, especially thinned binary images (line-art images). Expectations have grown for development of a thinning technique for thinning a line-art image consisting of boundaries of regions of the same color that constitute a clip art, for example.

SUMMARY OF THE INVENTION

Applying the method disclosed in Japanese Patent Application No. 2006-335070 to thinning of a line-art image consisting of boundaries of regions of the same color that constitute a clip art poses the problem described below.

As shown in FIG. 2, a 2-pixel×2-pixel core portion can remain in a thinned line-art image. FIG. 3 is an enlarged view of the relevant portion in FIG. 2. FIG. 4A shows an arrangement of the pixels of the 2-pixel×2-pixel core portion.

Vectors are extracted as the line art in such a manner that the four pixels of the 2-pixel×2-pixel core portion will be endpoints of different vector sequences. FIG. 4B shows the four vectors, each having an endpoint at one of the four pixels of the 2-pixel×2-pixel core. FIGS. 4C to 4F respectively show the four vectors.

As shown in FIGS. 4A to 4F, the vector sequences having an endpoint at the four pixels of the 2-pixel×2-pixel core portion of boundaries of the clip art are not connected one another. Accordingly, a portion is produced in which a series of vectors whose endpoints are contiguous so as to surround a closed region cannot be formed. Consequently, a portion of a contour geometry between adjacent color regions in a color image is produced that cannot be formed as a series of vectors whose endpoints are contiguous so as to surround a closed region.

The present invention provides an image processing apparatus that extracts a group of vectors in only one raster scan without breaking a line in a binary graphic or line drawing in a thinned binary image even if a four-pixel portion remains as a 2-pixel×2-pixel core in the thinned binary image.

According to the present invention, an image processing apparatus generating a thin line binary image and extracting vectors includes: a vector extracting unit configured to raster-scan the thin line binary image by using a pixel matrix including a plurality of pixels to extract a vector to which contour point information is added in accordance with a predetermined pattern of black and white pixels in the pixel matrix; and a coordinate correcting unit configured to detect that the vector has been extracted from a set of black pixels of 2 pixels×2 pixels in the pixel matrix by referring to the contour point information added to the vector and correct a coordinate of a core-line vector in accordance with coordinate correction information included in the contour point information, the core-line vector being produced by reducing the vector to a core line.

According to the present invention, an image processing method for generating a thin line binary image and extracting vectors, comprises the steps of: raster-scanning the thin line binary image by using a pixel matrix including a plurality of pixels to extract a vector to which contour point information is added in accordance with a predetermined pattern of black and white pixels in the pixel matrix; and detecting that the vector has been extracted from a set of black pixels of 2 pixels×2 pixels in the pixel matrix by referring to the contour point information added to the vector and correcting a coordinate of a core-line vector in accordance with coordinate correction information included in the contour point information, the core-line vector being produced by reducing the vector to a core line.

According to the present invention, a computer-readable program recording medium on which a program is recorded, the program causing a computer to function to: raster-scan the thin line binary image by using a pixel matrix including a plurality of pixels to extract a vector to which contour point information is added in accordance with a predetermined pattern of black and white pixels in the pixel matrix; and detect that the vector has been extracted from a set of black pixels of 2 pixels×2 pixels in the pixel matrix by referring to the contour point information added to the vector and correct a coordinate of a core-line vector in accordance with coordinate correction information included in the contour point information, the core-line vector being produced by reducing the vector to a core line.

According to the present invention, an image processing apparatus generating a thin line binary image and extracting vectors, comprises: a vector extracting unit configured to extract core-line vectors reduced to a core line from the thin line binary image; and a coordinate correcting unit configured to correct the coordinates of an endpoint of each of the core-line vectors, the core-line vector having the endpoint at four adjacent pixels in a pixel matrix.

According to the present invention, even if a thinned binary image contains four pixels that remain as a 2-pixel×2-pixel core portion, the image can be output as a set of vector sequences endpoints of which are connected without breaking a line at the portion.

Further features of the present invention will become apparent from the following description of exemplary embodiments with reference to the attached drawings.

BRIEF DESCRIPTION OF THE DRAWINGS

FIG. 3 is an enlarged view of the portion shown in FIG. 2;

FIGS. 10A to 10B show lists of contour point information given to contour points;

FIG. 11 shows a first pattern (case 0) of a point on contour and contour point information that are extracted in accordance with the state of a pixel of interest and its neighboring pixels;

FIGS. 12A to 12D show a second pattern (case 1) of points on contour and contour point information which are extracted in accordance with the state of a pixel of interest and its neighboring pixels;

FIGS. 13A to 13D show a third pattern (case 2) of points on contour and contour point information which are extracted in accordance with the state of a pixel of interest and its neighboring pixels;

FIGS. 14A to 14D show a fourth pattern (case 3) of points on contour and contour point information which are extracted in accordance with the state of a pixel of interest and its neighboring pixels;

FIGS. 15A to 15D show a fifth pattern (case 4) of points on contour and contour point information which are extracted in accordance with the state of a pixel of interest and its neighboring pixels and contour point information;

FIGS. 16A to 16P show a sixth pattern (case 5) of points on contour and contour point information which are extracted in accordance with the state of a pixel of interest and its neighboring pixels;

FIGS. 17A to 17D show a seventh pattern (case 6) of points on contour and contour point information which are extracted in accordance with the state of a pixel of interest and its neighboring pixels;

FIGS. 18A to 18H show an eighth pattern (case 7) of points on contour and contour point information which are extracted in accordance with the state of a pixel of interest and its neighboring pixels;

FIGS. 19A to 19D show a ninth pattern (case 8) of points on contour and contour point information which are extracted in accordance with the state of a pixel of interest and its neighboring pixels;

FIGS. 20A to 20D show a tenth pattern (case 9) of points on contour and contour point information which are extracted in accordance with the state of a pixel of interest and its neighboring pixels;

FIGS. 21A to 21P show an eleventh pattern (case 10) of points on contour and contour point information which are extracted in accordance with the state of a pixel of interest and its neighboring pixels;

FIGS. 22A to 22H show a twelfth pattern (case 11) of points on contour and contour point information which are extracted in accordance with the state of a pixel of interest and its neighboring pixels;

FIGS. 23A to 23D show a thirteenth pattern (case 12) of points on contour and contour point information which are extracted in accordance with the state of a pixel of interest and its neighboring pixels;

FIGS. 24A to 24H show a fourteenth pattern (case 13) of points on contour and contour point information which are extracted in accordance with the state of a pixel of interest and its neighboring pixels;

FIGS. 25A to 25H show a fifteenth pattern (case 14) of points on contour and contour point information which are extracted in accordance with the state of a pixel of interest and its neighboring pixels;

FIGS. 39A to 39F are diagrams showing a process sequence from input of a binary image to generation of smoothed vectors;

FIGS. 40A to 40F are a first set of diagrams illustrating a process performed by an endpoint coordinate correcting unit;

DESCRIPTION OF THE EMBODIMENTS

Figure 1:
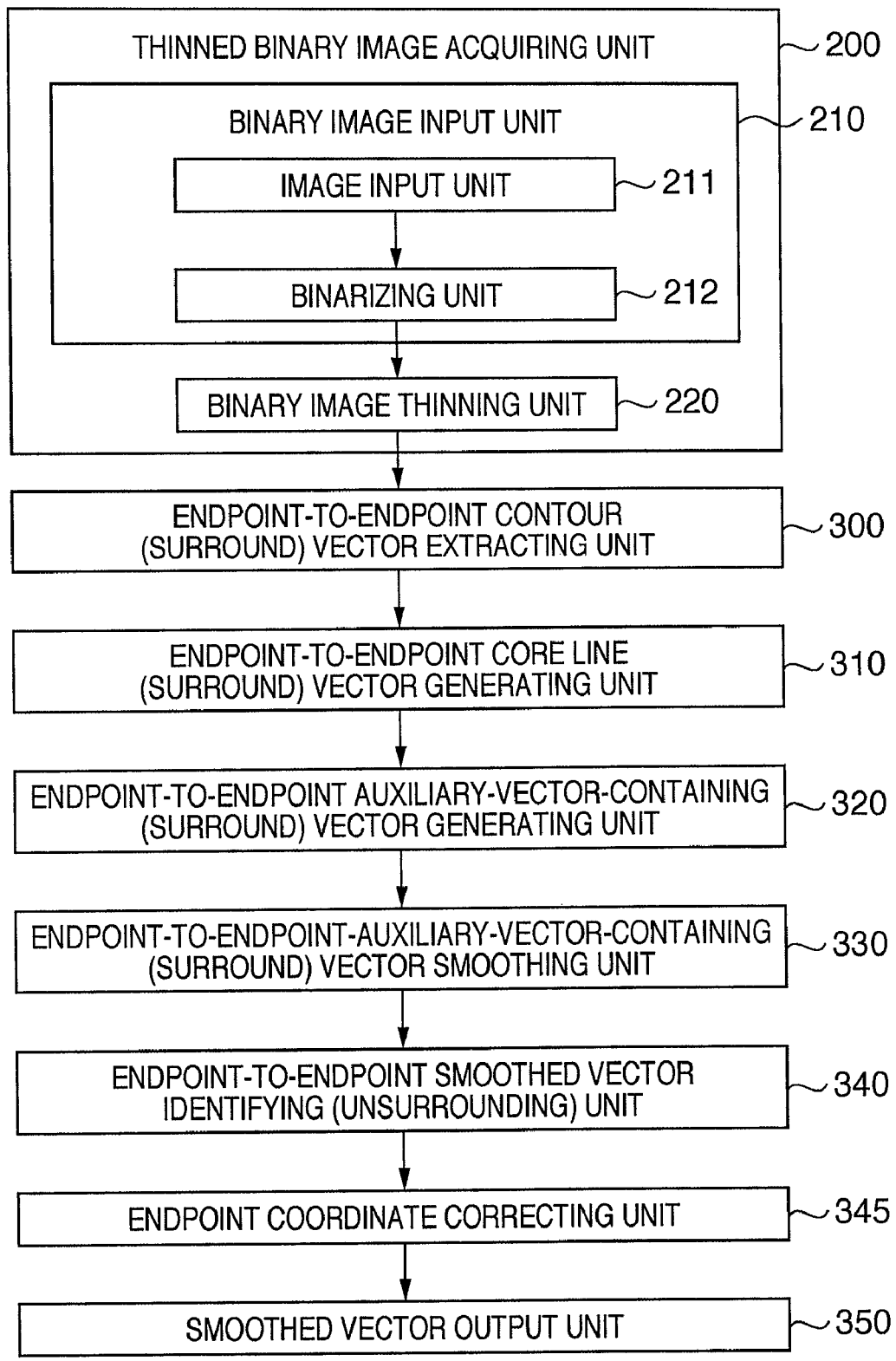
FIG. 1 is a functional block diagram of an image processing apparatus according to an embodiment of the present invention.
Figure 2:
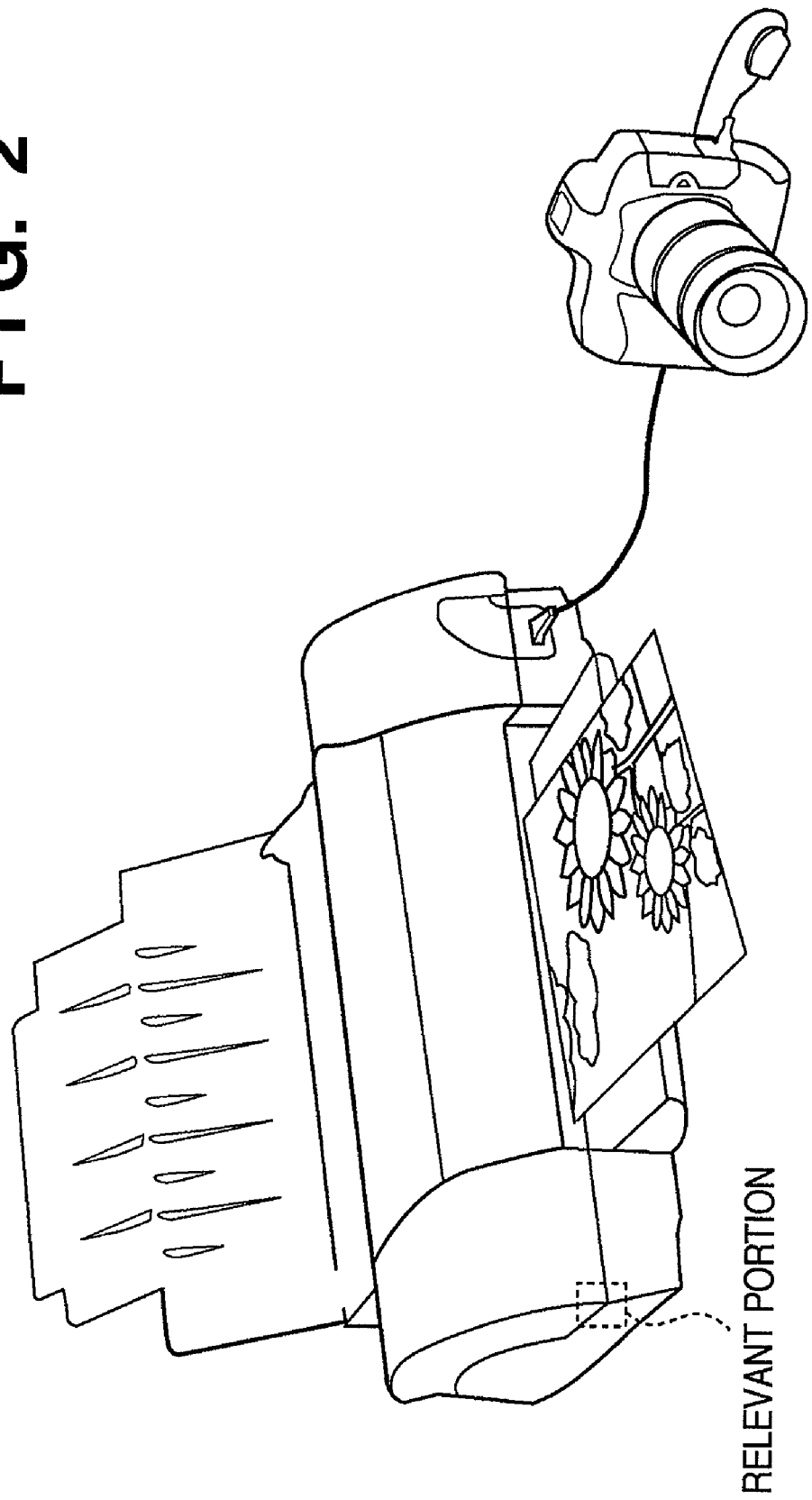
FIG. 2 is a diagram showing an example of a thinned binary image in which a portion remains as a 2-pixel×2-pixel core.
Figure 4F:
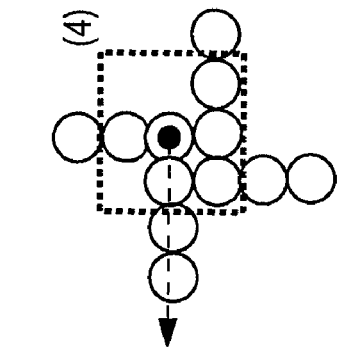
FIGS. 4A to 4F are diagrams showing an arrangement of the 2 pixels×2 pixels in a core portion and an example of vector extraction.
Figure 4B:
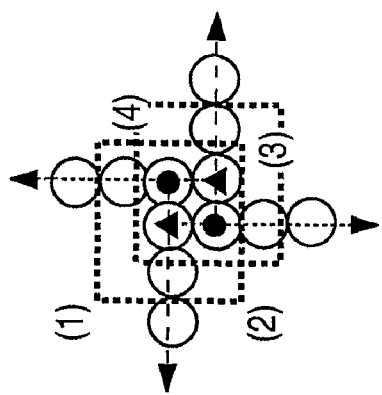
Figure 4E:
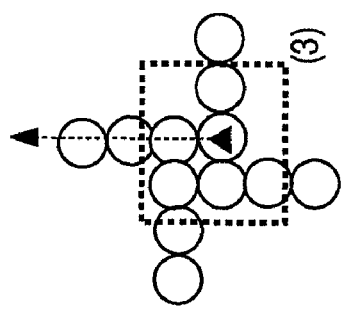
Figure 4D:
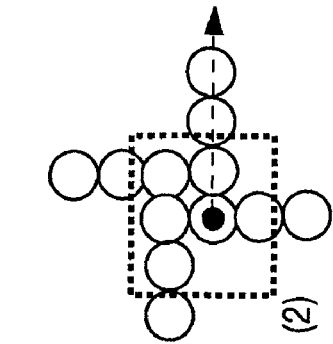
Figure 4A:
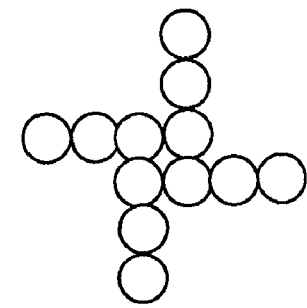
Figure 4C:
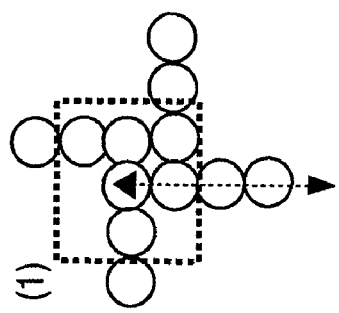

The best mode for carrying out the present invention will be described in detail with reference to the accompanying drawings. Like elements are labeled with like reference numerals and repeated description of which will be omitted.

FIG. 1 is a functional block diagram of an image processing apparatus that embodies the present invention. In FIG. 1, a thinned binary image acquiring unit 200 outputs a binary image which is generated by thinning a binary image output from a binary image input unit 210 including an image input unit 211 such as a known scanner and a binarizing unit 212 to a 4-connected thin line binary image by a known binary image thinning unit 220. That is, image data read by photoelectric scanning at the image input unit 211 such as a known scanner is binarized by the known binarizing unit 212 using thresholding. The binary image thus obtained is thinned at the binary image thinning unit 220 with 4-connectivity thinning using a Hilditch algorithm, for example, which is a known thinning method. The Hilditch algorithm is described in documents such as "Basics and Application of Digital Image Processing" by Koichi Sakai (second edition, ISBN4-7898-3707-6, CQ Publishing, issued in Feb. 1, 2004, pp. 51-54).

FIG. 39A shows an example of a binary image input in the binary image thinning unit 220. FIG. 39B shows a thinned image output from the binary image thinning unit 220 when the binary image shown in FIG. 39A is input.

The thinned 4-connected binary image is processed by an endpoint-to-endpoint contour (surround) vector extracting unit 300. Line drawings in the thinned binary image to be processed are extracted as a set of vector sequences (hereinafter also referred to as an endpoint-to-endpoint linear element rough contour vectors) corresponding to independent lines and closed curves connecting endpoints and intersection points constituting the line drawings in one raster scan. The extracted vector sequences are output as the result of the processing. The output result of the processing includes information indicating whether each of the vectors constituting each vector sequence was extracted from a portion corresponding to an endpoint (intersection point) location of a line drawing to be processed or represents an endpoint obtained from a 2-pixel×2-pixel core portion. Such information will also be hereinafter referred to as additional information. The combination of such additional information and an endpoint-to-endpoint linear element rough contour vector will be referred to as an endpoint-to-endpoint contour (surround) vector in the present embodiments. An endpoint-to-endpoint contour (surround) vector may be vector data that is suitable for applications where one wants to treat only lines constituting the contour of a figure as merely a line (such as a straight lines, open curve, or closed curve) or a set of lines, instead of giving meanings to notions such as thickness and area. Alternatively, an endpoint-to-endpoint contour vector may be vector data suitable for reuse as a line drawing drawn using only thin lines without considering the original thicknesses.

An endpoint-to-endpoint core line (surround) vector generating unit 310 receives endpoint-to-endpoint contour (surround) vectors obtained from an endpoint-to-endpoint contour (surround) vector extracting unit 300 and uses additional information to generate endpoint-to-endpoint core line (surround) vectors which are vectors reduced to a core line with a width of "0". Hereinafter an endpoint-to-endpoint core line (surround) vector is also referred to as a core-line vector. The endpoint-to-endpoint core line (surround) vector generating unit 310 fine-adjusts the position of each of one-pixel-wide contour (surround) vectors in each appropriate direction by half a pixel in accordance with a predetermined rule. FIG. 39C shows contour images which are visualizations of endpoint-to-endpoint contour (surround) vectors output from the endpoint-to-endpoint contour (surround) vector extracting unit 300 when the binary image shown in FIG. 39B is input. FIG. 39D shows line drawings which are visualizations of endpoint-to-endpoint core line (surround) vectors output from the endpoint-to-endpoint core line (surround) vector generating unit 310 when the image data shown in FIG. 39C is input.

An endpoint-to-endpoint-auxiliary-vector-containing (surround) vector generating unit 320 receives endpoint-to-endpoint core line (surround) vectors obtained from the endpoint-to-endpoint core line (surround) vector generating unit 310. Then, the endpoint-to-endpoint-auxiliary-vector-containing (surround) vector generating unit 320 prevents vectors corresponding to endpoints from being combined with other vectors to obscure the positions of the endpoints during smoothing (function approximation) by an endpoint-to-endpoint-auxiliary-vector-containing (surround) vector smoothing unit 330 at the next step. To that end, in the present embodiment, auxiliary vectors are inserted to generate endpoint-to-endpoint-auxiliary-vector-containing (surround) vectors so that the portions corresponding to endpoints are preserved as endpoints (so that they become anchor points of Bezier curves). In addition, the endpoint-to-endpoint-auxiliary-vector-containing (surround) vector generating unit 320 also generates starting and ending endpoint information for the endpoint-to-endpoint-auxiliary-vector-containing (surround) vectors having an auxiliary vector inserted therein that indicates which of the vectors are at endpoints. FIG. 39E shows line drawings which are visualizations of endpoint-to-endpoint-auxiliary-vector containing (surround) vectors output from the endpoint-to-endpoint-auxiliary-vector-containing (surround) vector generating units 320 when the image data shown in FIG. 39D is input.

The endpoint-to-endpoint-auxiliary-vector-containing (surround) vector smoothing unit 330 receives endpoint-to-endpoint-auxiliary-vector-containing (surround) vectors obtained from the endpoint-to-endpoint-auxiliary-vector-containing (surround) vector generating unit 320. The endpoint-to-endpoint-auxiliary-vector-containing (surround) vector smoothing unit 330 applies smoothing (function approximation) to each of the (surround) vectors to generate smoothed (function-approximated) endpoint-to-endpoint-auxiliary-vector-containing (surround) vectors. Then, the endpoint-to-endpoint-auxiliary-vector-containing (surround) vector smoothing unit 330 outputs the vectors to an endpoint-to-endpoint smoothed vector identifying (unsurrounding) unit 340.

The endpoint-to-endpoint smoothed vector identifying (unsurrounding) unit 340 receives smoothed (function-approximated) endpoint-to-endpoint-auxiliary-vector-containing (surround) vectors and starting and ending endpoint information obtained from the endpoint-to-endpoint-auxiliary-vector-containing (surround) vector generating unit 320. Then, the endpoint-to-endpoint smoothed vector identifying (unsurrounding) unit 340 identifies vectors at the starting and ending endpoints of each smoothed (surround) vector and generates non-surround vector sequences only for the section between starting and ending endpoints.

An endpoint coordinate correcting unit 345 receives non-surround vector sequences only for the sections between starting and ending endpoints as well as starting and ending endpoint information and additional information on the starting and ending endpoints which can be obtained from the endpoint-to-endpoint-auxiliary-vector-containing (surround) vector generating unit 320. Then, the endpoint coordinate correcting unit 345 identifies vectors at the starting and ending endpoints of each of the smoothed (surround) vectors. At the same time, the endpoint coordinate correcting unit 345 corrects the coordinates of an endpoint obtained from the 2-pixel×2-pixel core portion among the starting and ending endpoints to the coordinates of the center position of the 2-pixel×2-pixel portion. In this way, the endpoint coordinate correcting unit 345 generates a non-surround vector sequence only of the section between the starting and ending endpoints. Then, the vector sequences are output to a smoothed vector output unit 350 at the next stage and then are output as a file or to an external device through a communication interface 4. FIG. 39F shows line drawings which are visualizations of the smoothed vectors output from the endpoint-to-endpoint smoothed vector identifying (unsurrounding) unit 340 when the image data shown in FIG. 39E is input.

FIGS. 40C to 40F show outputs from the endpoint coordinate correcting unit 345 which are provided when the image data shown in FIGS. 4C to 4F are input. That is, FIGS. 40C to 40F are drawings, each of which is a visualization of how the coordinates of an endpoint obtained from a 2-pixel×2-pixel core portion is corrected to the coordinates of the position corresponding to the center of the 2 pixels×2 pixels and the corrected coordinates are output as an endpoint. Similarly, FIGS. 41C to 41F show outputs from the endpoint coordinate correcting unit 345 which are provided when patterns symmetric to the patterns in FIGS. 4C to 4F are input. Here, the coordinates obtained from the 2-pixel×2-pixel core portion have been corrected to the coordinates corresponding to the position at the center of the 2×2 pixels.

Figure 5:
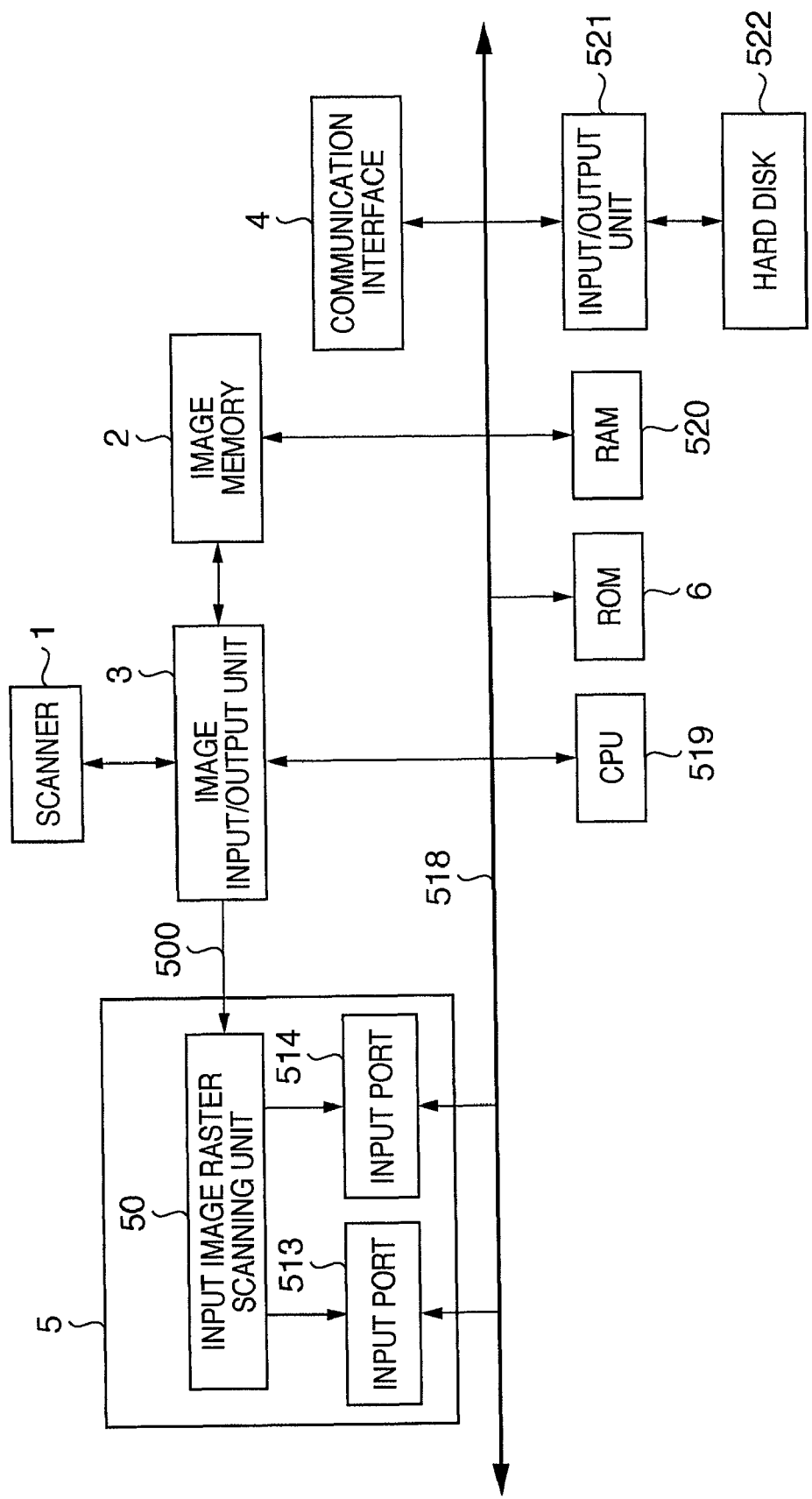
FIG. 5 is a diagram showing a configuration of an image processing apparatus according to an embodiment of the present invention.

FIG. 5 shows an exemplary hardware configuration that implements an image processing apparatus according to the present embodiment. In FIG. 5, a bus 518 represents a bus in the image processing apparatus used in the present embodiment. A scanner 1 constitutes the image input unit 211 of the binary image input unit 210 shown in FIG. 1. An image memory 2 holds a multivalued image read by the scanner 1 through an image input/output unit 3 before binarization and also holds binary image data generated by binarizing the multivalued image data. The image memory 2 and the scanner 1 constitute the thinned binary image acquiring unit 200 shown in FIG. 1. An endpoint-to-endpoint contour (surround) vector extracting unit 5 constitutes the endpoint-to-endpoint contour (surround) vector extracting unit 300 shown in FIG. 1. Thinned binary image data is sequentially input in an input image raster scanning unit 50 through the image input/output unit 3 and a signal line 500. Input ports 513 and 514 input the state of each pixel through a scanning window of nine (3×3) pixels. The communication interface 4 provides communication with an external device through a network. A RAM 520 is a working memory for a CPU 519. A ROM 6 stores a program to be executed by the CPU 519 in accordance with a procedure, which will be described later and predetermined parameters and data. The CPU 519, RAM 520, and ROM 6 implement the endpoint-to-endpoint core line (surround) vector generating unit 310, the endpoint-to-endpoint-auxiliary-vector-containing (surround) vector generating unit 320, and the endpoint-to-endpoint-auxiliary-vector-containing (surround) vector smoothing unit 330 shown in FIG. 1. The CPU 519, RAM 520, and ROM 6 also implement the endpoint-to-endpoint smoothed vector identifying (unsurrounding) unit 340 and the endpoint coordinate correcting unit 345. The input/output unit 521 acts as an interface with a hard disk 522.

Processing performed in the endpoint-to-endpoint contour (surround) vector extracting unit 300 will be described below with primary reference to FIGS. 6 and 7 and FIGS. 10 to 26. In the present embodiment, the state of a pixel of interest 101 in a binary image and its eight neighboring pixels is detected as shown in FIG. 7 and processing is performed. Pixels of interest are raster scanned and the entire image is sequentially processed while the center of the scanning window is moved from pixel to pixel.

In FIG. 7, the symbol "x" represents a pixel 101 of interest. The locations denoted by "0" and "2" represent the pixel "0" one raster before the pixel of interest 101 and the pixel "2" one raster after the pixel of interest 101, respectively, in the sub scanning direction in the same column as the pixel of interest 101 with respect to the main scanning direction. The locations denoted by "1" and "3" represent the pixel "1" one pixel after the pixel of interest 101 and the pixel "3" one pixel before the pixel of interest 101, respectively, on the same raster as the pixel of interest 101. "A" and "B" denote the pixels one pixel after the pixel of interest 101 in the main scanning direction and one raster before and after, respectively, the pixel of interest 101. "C" and "D" represent the pixels one pixel before the pixel of interest 101 in the main scanning direction and one raster after and before, respectively, the pixel of interest 101.

Figure 6:
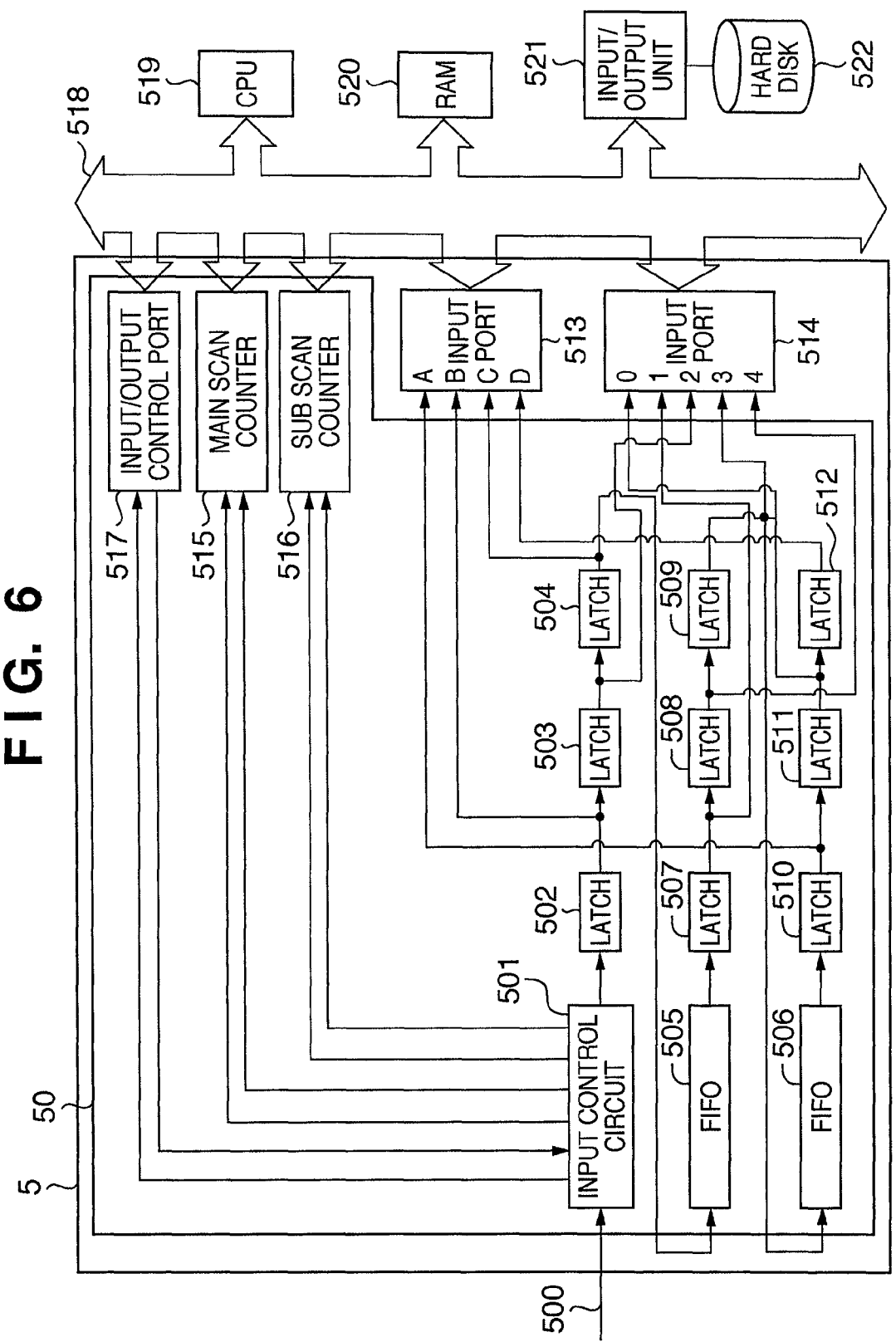
FIG. 6 is a diagram showing a configuration of an endpoint-to-endpoint contour (surround) vector extracting unit.
Figure 7:
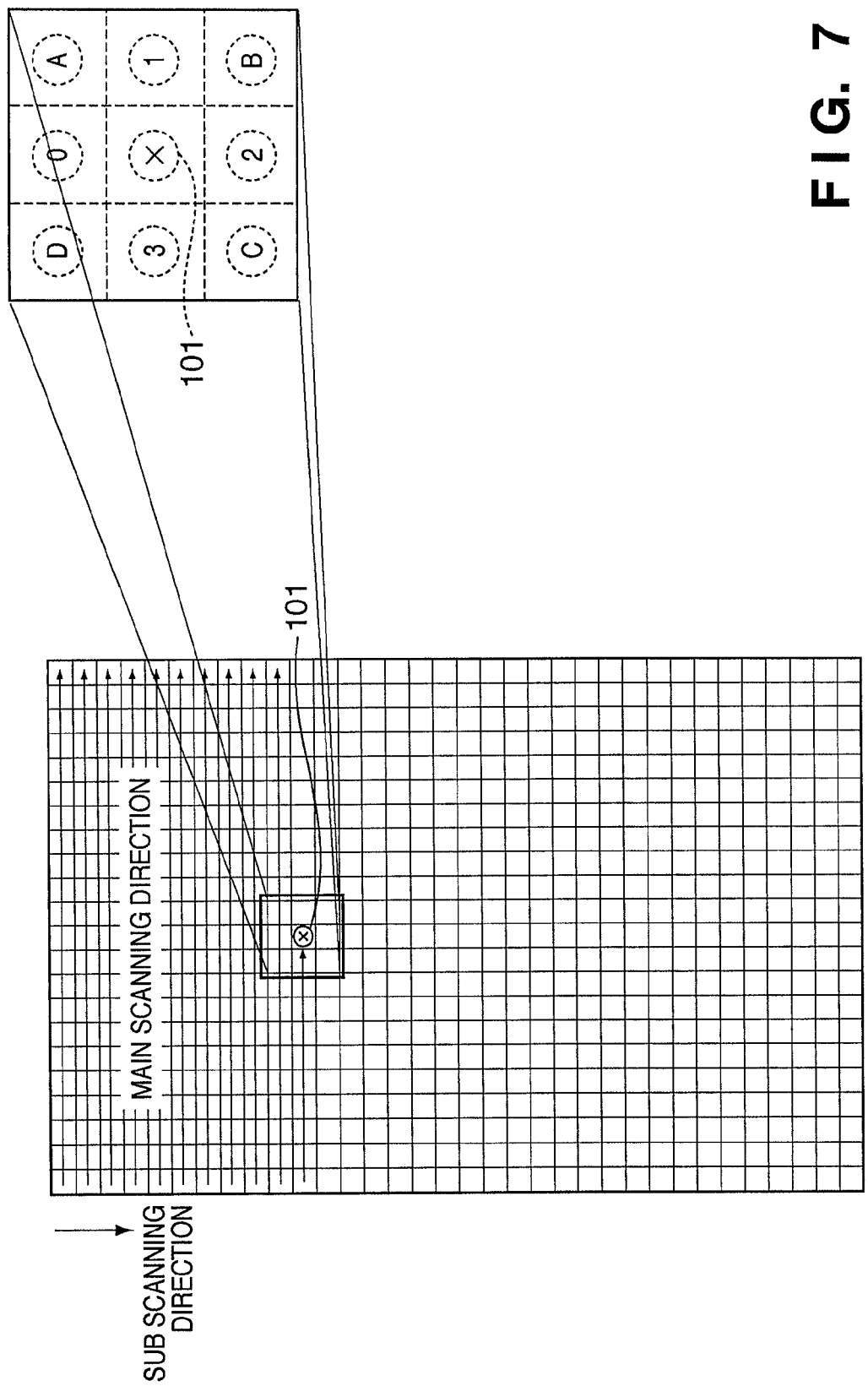
FIG. 7 is a diagram showing a pixel of interest and its neighboring pixels in an image matrix.

FIG. 6 shows in further detail an exemplary configuration of the endpoint-to-endpoint contour (surround) vector extracting unit 5 in FIG. 5. In FIG. 6, thinned binary image data is sequentially input into the input image raster scanning unit 50 through the image input/output unit 3 and the signal line 500. An input control circuit 501 communicates image data input through the signal line 500 and binary image data is sequentially input in the input control circuit 501 in a raster scanning manner. A latch 502 holds image data, one pixel after another, input from the input control circuit 501 in synchronization with a pixel synchronization clock, not shown. The next pixel data from the input control circuit 501 is input in the latch 502 at the next clock cycle and, at the same time, the pixel data already held in the latch 502 is latched and held in a latch 503 in synchronization with the pixel clock. Similarly, pixel data held in the latch 503 is held at a latch 504 at this next pixel synchronization clock cycle.

FIFOs 505 and 506 are FIFO (First In, First Out) memories that hold one raster of pixel data, respectively. The FIFO 505 sequentially takes in outputs from the latch 504 in synchronization with the pixel synchronization clock and outputs pixel data of the previous raster to a latch 507. Similarly, the FIFO 506 takes in outputs from a latch 509 and outputs the pixel data of the previous raster to a latch 510. The latches 507, 508, and 509 and 510, 511, and 512 operate in the same way as the latches 502, 503, and 504.

The nine pixels thus held in the latches 502, 503, 504, 507, 508, 509, 510, 511, and 512 represent the pixel data in the area of nine (3×3) pixels shown in FIG. 7. That is, the data in the latches correspond to "B", "2", "C", "1", "x", "3", "A", "0", and "D" in FIG. 7.

Through the input ports 513 and 514, the state of each pixel in the scanning window consisting of nine (3×3) pixels is input. The input ports 513 and 514 are input ports for the CPU 519. The input port 513 inputs the data from the latches 510, 502, 504, and 512, that is, the data in locations "A", "B", "C", and "D" in FIG. 7, into the CPU 519. Similarly, the input port 514 inputs the data from the latches 511, 507, 503, 509, and 508, that is, the data in locations "0", "1", "2", "3", and "x", into the CPU 519.

A main scan counter 515 indicates a pixel location in the main scanning direction, is reset by a sub scanning synchronization signal, not shown, and counts up in synchronization with the pixel synchronization signal. A sub scan counter 516 indicates a pixel location in the sub scanning direction, is reset by a page synchronization signal, not shown, and counts up in synchronization with the sub scanning synchronization signal. The input/output control port 517 is a port for controlling inputs and outputs, and holds a signal instructing the input control circuit 501 to execute and suspend pixel data input and a signal notifying an update of pixel data from the input control circuit 501 to the CPU 519. The input/output unit 521 is a device for controlling inputs and outputs to the hard disk 522. The input/output control port 517, the main scan counter 515, the sub scan counter 516, the input ports 513 and 514, the RAM 520, and the input/output unit 521 are connected to the CPU 519 through the bus 518. Thus, the CPU 519 can update pixel data through the input/output control port 517 and identify the pixel location (i, j) of a pixel of interest through the main scan counter 515 and the sub scan counter 516. The CPU 519 can also know the state of the pixel of interest and the neighboring pixels in the eight directions through the input ports 513 and 514. After completion of processing of a pixel of interest, the CPU 519 instructs to update the pixel data stored in the nine latches through the input/output control port 517 and at the same time resets a pixel data update completion signal. In response to the update instruction, the input control circuit 501 clears the pixel data update instruction signal and updates the pixel data latched in the latches in the subsequent stage and, after the completion of the update, outputs a update completion signal to the input/output control port 517. After outputting the update instruction, the CPU 519 monitors for an update completion signal input from the input/output control port 517. Upon input of the update completion signal, the CPU 519 performs processing of the pixel data newly held in the nine latches and repeats the same processing. After the last pixel in the image region is processed as a pixel of interest, the input control circuit 501 outputs an end signal to the input/output control port 517.

Processing that varies depending on the state of a pixel of interest and eight neighboring pixels will be described next. When the pixel of interest is a white pixel, the processing of the pixel is ended and the raster scan is moved by one pixel to the position of the next pixel of interest. On the other hand, when the pixel of interest is a black pixel, the following processing is performed that depends on the state of the neighboring pixels.

FIGS. 11 to 26 show processing for different states. Large circles filled with a crosshatched pattern represent black pixels, large dashed circles represent white pixels, and "d" represents "do not care", that is, the pixels may be white or black pixels. In the pixel matrices of multiple pixels shown in FIGS. 11 to 26, a black circle and a white circle represent the starting point of a horizontal vector and the end point of a vertical vector, respectively, and a black triangle and a white triangle represent the starting point of a vertical vector and the end point of a horizontal vector, respectively. The solid arrow between the starting and end points of a vector represent a contour vector in the direction indicated by the arrow whose starting and end points have been determined. A dashed arrow represents a contour vector in the direction indicated by the arrow one of the starting and end points of which has been determined. The starting and end point of a contour vector will be collectively referred to as points on contour. A black circle and a black triangle represent the starting and end points of vectors extracted from an endpoint portion. The black circle represents the starting point of a horizontal vector and the end point of a vertical vector extracted from an endpoint portion; the black triangle represents the starting point of a vertical vector and the end point of a horizontal vector extracted from the endpoint portion.

One of the items of contour point information listed in FIGS. 10A and 10B is added to each of the points on contour shown in FIGS. 11 to 26 as additional information associated with the point. The contour point information is the additional information extracted along with each point on contour.

The 32 items of contour point information numbered 01 through 32 in FIGS. 10A and 10B are represented in the format "www_xxx", "www_xxx_yyy", or "www_xxx_yyy_zzz". Here, the portion "www" represents the direction of a vector that has the point on contour of interest as its end point and the portion "_xxx" represents the direction of a vector that has the point on contour as its starting point. The upward direction is represented as UP, the downward direction is represented as DOWN, the rightward direction by RIGHT, and the leftward direction by LEFT. For example, each of the items of information numbered 01 through 07 represents a point on contour that is the end point of an upward vector and the starting point of a rightward vector.

The portion "_yyy" represents that the point on contour that has the additional information is extracted from an endpoint portion indicated in the endpoint information column in FIGS. 10A and 10B.

Figure 8A:
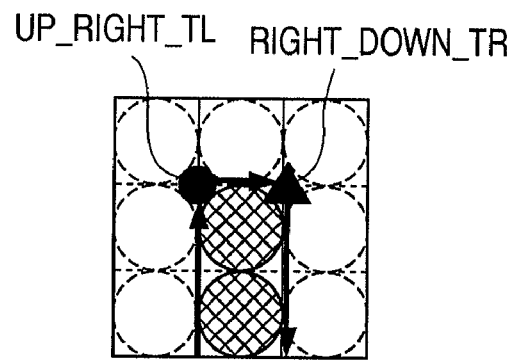
FIGS. 8A to 8D are diagrams showing exemplary points on contour detected at endpoints and contour point information added to the points on contour.
Figure 8B:
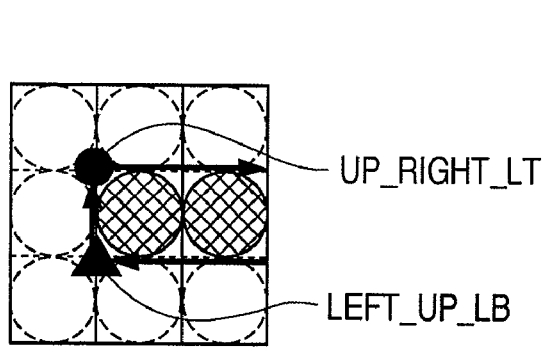
Figure 8C:
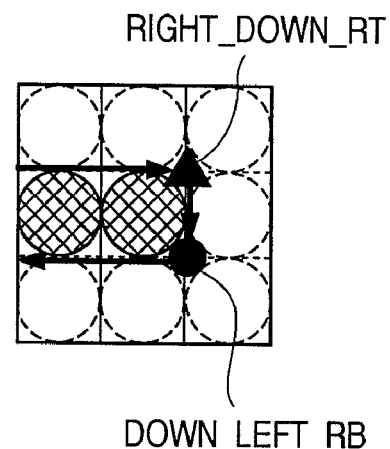
Figure 8D:
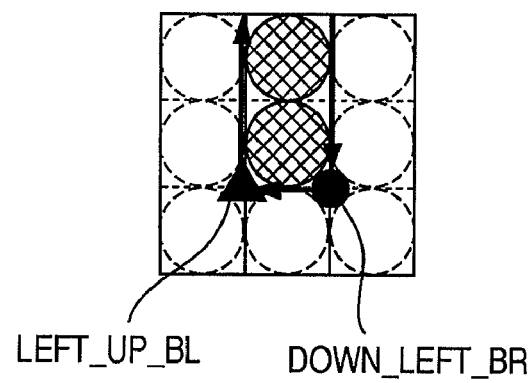
Figure 9A:
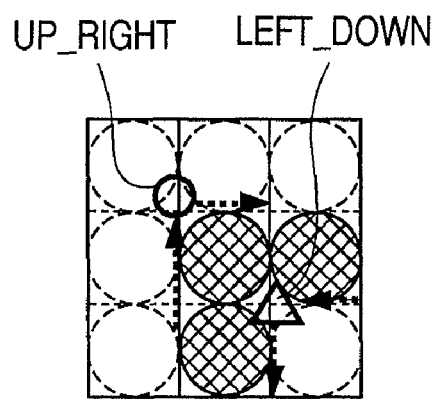
FIGS. 9A to 9D are diagrams showing exemplary points on contour detected at non-endpoints and contour point information added to the points on contour.
Figure 9B:
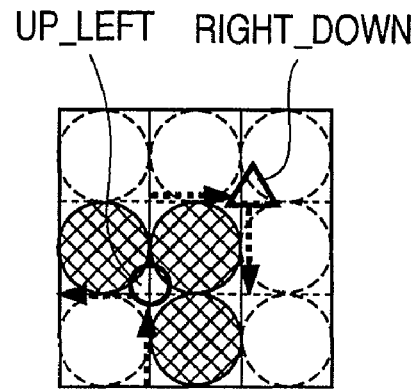
Figure 9C:
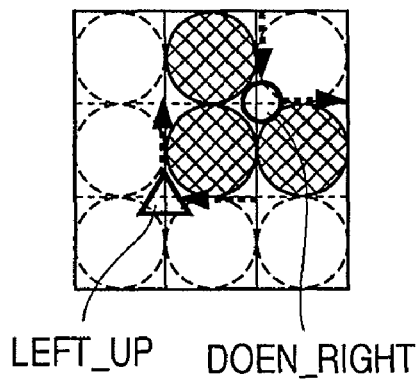
Figure 9D:
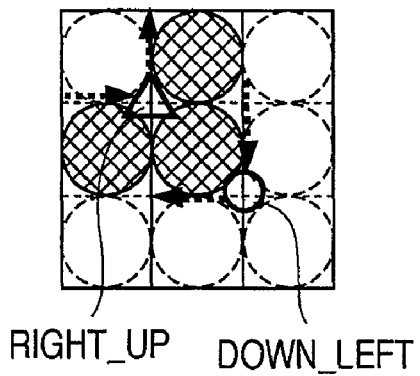
Figure 26:
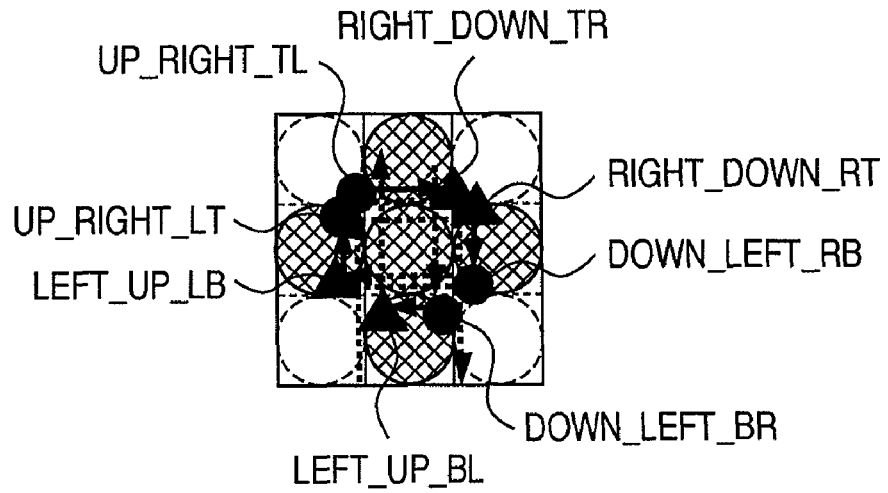
FIG. 26 shows a sixteenth pattern (case 15) of points on contour and contour point information which are extracted in accordance with the state of a pixel of interest and its neighboring pixels.

Here, "_TL" indicates an endpoint extracted from the top left of a linear element as shown in FIG. 8A. "_LT" indicates an endpoint extracted from the left top of a linear element as shown in FIG. 8B. "_BR" indicates an endpoint extracted from the bottom right of a linear element as shown in FIG. 8D. "_RB" indicates an endpoint extracted from the right bottom of a linear element as shown in FIG. 8C. "_LB" indicates an endpoint extracted from the left bottom of a linear element as shown in FIG. 8B. "_BL" indicates an endpoint extracted from the bottom left of a linear element as shown in FIG. 8D. "_RT" indicates an endpoint extracted from the right top of a linear element as shown in FIG. 8C. "_TR" indicates an endpoint extracted from the top right of a linear element as shown in FIG. 8A.

The portion "_zzz" represents that the point on contour that has the additional information is of an endpoint portion extracted from four pixels of a 2-pixel×2-pixel core portion remaining in the thinned binary image, which is an input image. The column "Direction of correction" in FIGS. 10A and 10B contains the meaning.

Figure 41A:
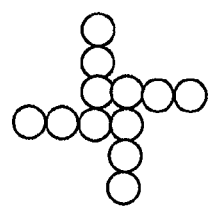
FIGS. 41A to 41F are a second set of diagrams illustrating a process performed by the endpoint coordinate correcting unit.
Figure 41B:
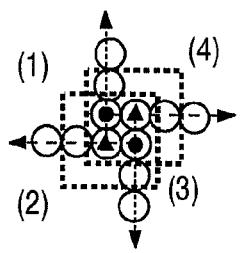
Figure 41C:
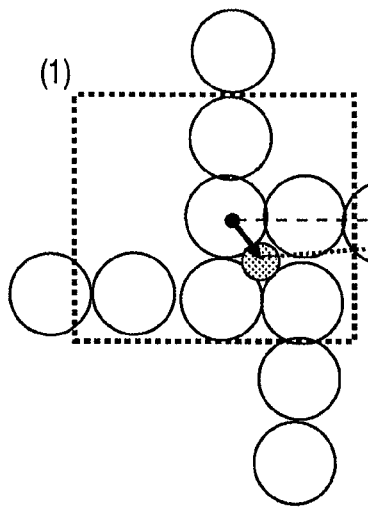
Figure 41D:
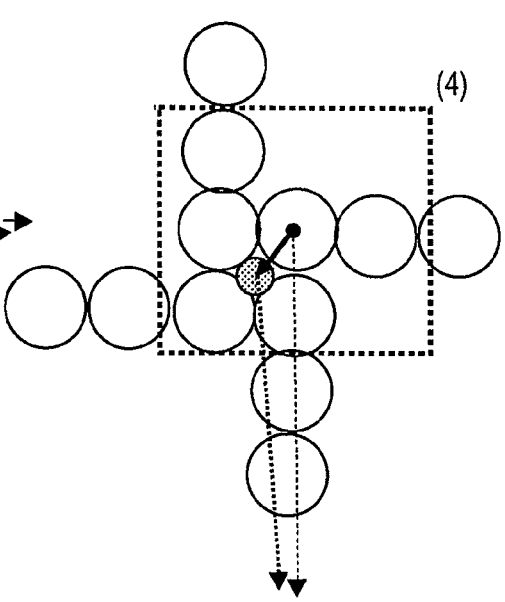
Figure 41E:
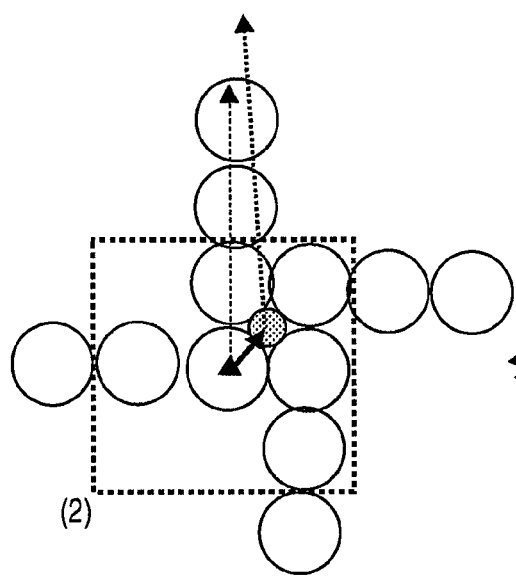
Figure 41F:
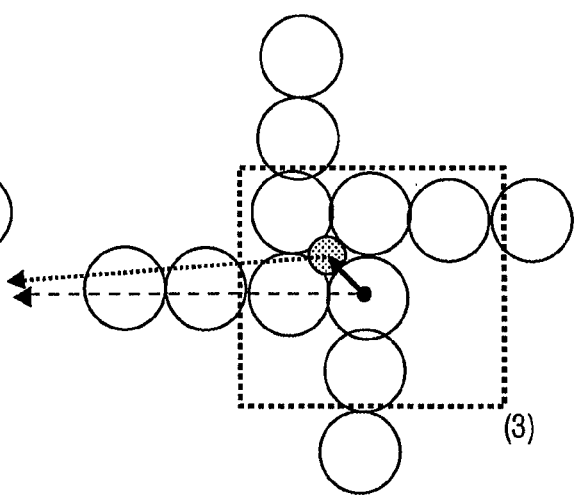

Here, "_1" indicates an endpoint to be moved by half a pixel in the upper left direction because the endpoint is to be corrected to the center of the four pixels remaining as a 2-pixel×2-pixel core portion after reduction to a core line as shown in FIGS. 40E and 41F. "_2" indicates an endpoint to be moved by half a pixel in the lower left direction as shown in FIGS. 40F and 41D. "_3" indicates an endpoint to be moved by half a pixel in the upper right direction because the endpoint is to be corrected to the center of the four pixels remaining as a 2-pixel×2-pixel core portion after reduction to a core line. "_4" indicates an endpoint to be moved by half a pixel in the lower right direction as shown in FIGS. 40C and 41C.

Contour point information without the portions "_yyy" and "_zzz" is added to points on contour extracted from portions that are not the endpoints of linear elements (hereinafter also referred to as non-endpoint portions). Examples of such points on contour are shown in FIGS. 9A to 9D. When a pixel of interest is a black pixel and a point on contour in any of the states shown in FIGS. 11 to 26 and its additional information are to be extracted depending on the state of its neighboring pixels, the contour point information is extracted with the value contained in the corresponding location in the column "Value" in FIGS. 10A and 10B.

It is assumed in the present embodiment that the starting and end points of a contour vector are in intermediate positions between pixels in both main and sub scanning directions. Pixel locations are indicated by positive integers both in the main and sub scanning directions and are represented by two-dimensional coordinates. In order to avoid decimal fraction expression, only even numbers are used to represent pixel locations in the following description for the sake of convenience and the positions of starting and end points are represented by odd integers. That is, an image of m by n pixels is represented by coordinate expression of positive even numbers (integers), 2m by 2n. A binary image is represented by the two-dimensional coordinate system in which the main scanning direction is the x-coordinate direction and the sub scanning direction is the y-coordinate direction as described above and each binary image consists of m pixels in the x-coordinate direction by n rasters in the y-coordinate direction, that is, by n pixels, (where m and n are positive integers). The i-th pixel location in the j-th raster is represented as (2i, 2j) (where i and j are positive integers and i≦m and j≦n). The positive direction of the main scanning (x-coordinate) direction is from left to right and the positive direction of the sub scanning (y-coordinate) direction is from top to bottom.

A sequence of operation steps of the endpoint-to-endpoint contour (surround) vector extracting unit 300 will be described below with reference to the flowcharts of FIGS. 27 to 29. In the present embodiment, the endpoint-to-endpoint contour (surround) vector extracting unit 300 detects endpoints and intersection points in a 4-connected thin line binary image and extracts a group of independent vectors corresponding to line components as a set of independent linear elements and closed curves that connect the endpoints and intersection points. In addition, the endpoint-to-endpoint contour (surround) vector extracting unit 300 can add contour point information to each point on contour and extract the points on the contour together with the added contour point information. A scanning window of nine (3×3) pixels as shown in FIGS. 11 to 26 is used to raster-scan the image to determine the state of a pixel of interest and its eight neighboring pixels as a pixel pattern of 3 pixels×3 pixels, thereby extracting points on contour one by one. Therefore, the flow of the operation can be configured in the same way as a generally known extraction operation, except for the process for extracting points on contour and contour point information according to the pattern of 3 pixels×3 pixels. The pixel patterns shown in FIGS. 11 to 26 are patterns that can be recognized when a 4-connected thin line binary image is input.

Figure 27:
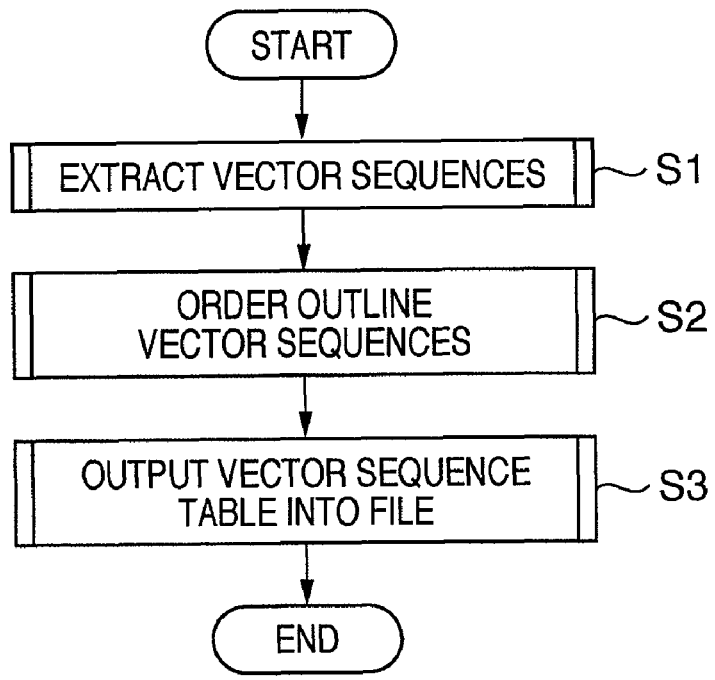
FIG. 27 is a flowchart showing a process procedure performed by the endpoint-to-endpoint (surround) vector extracting unit.

FIG. 27 is a flowchart showing a general flow of the contour extraction process performed by the CPU 519 according to the present embodiment. In the present embodiment, contour point information is considered as attribute information added to extracted points on contour. When extracted points on contour is processed, contour point information on each point on contour is always treated as part of information on the point on contour that is associated with the point on contour. This can be readily accomplished by treating contour point information as part of a data structure including the coordinates of the point on contour in the data format of the point on contour.

First, at step S1, vector sequences are extracted from binary image data along with points on contour and contour point information. The coordinates of the starting point of each vector and a vector flowing into the vector (a vector whose end point coordinates are the coordinates of the starting point of the former vector) and a vector flowing out of the vector (a vector whose starting point coordinates are the coordinates of the end point of the former vector) are output.

Figure 30:
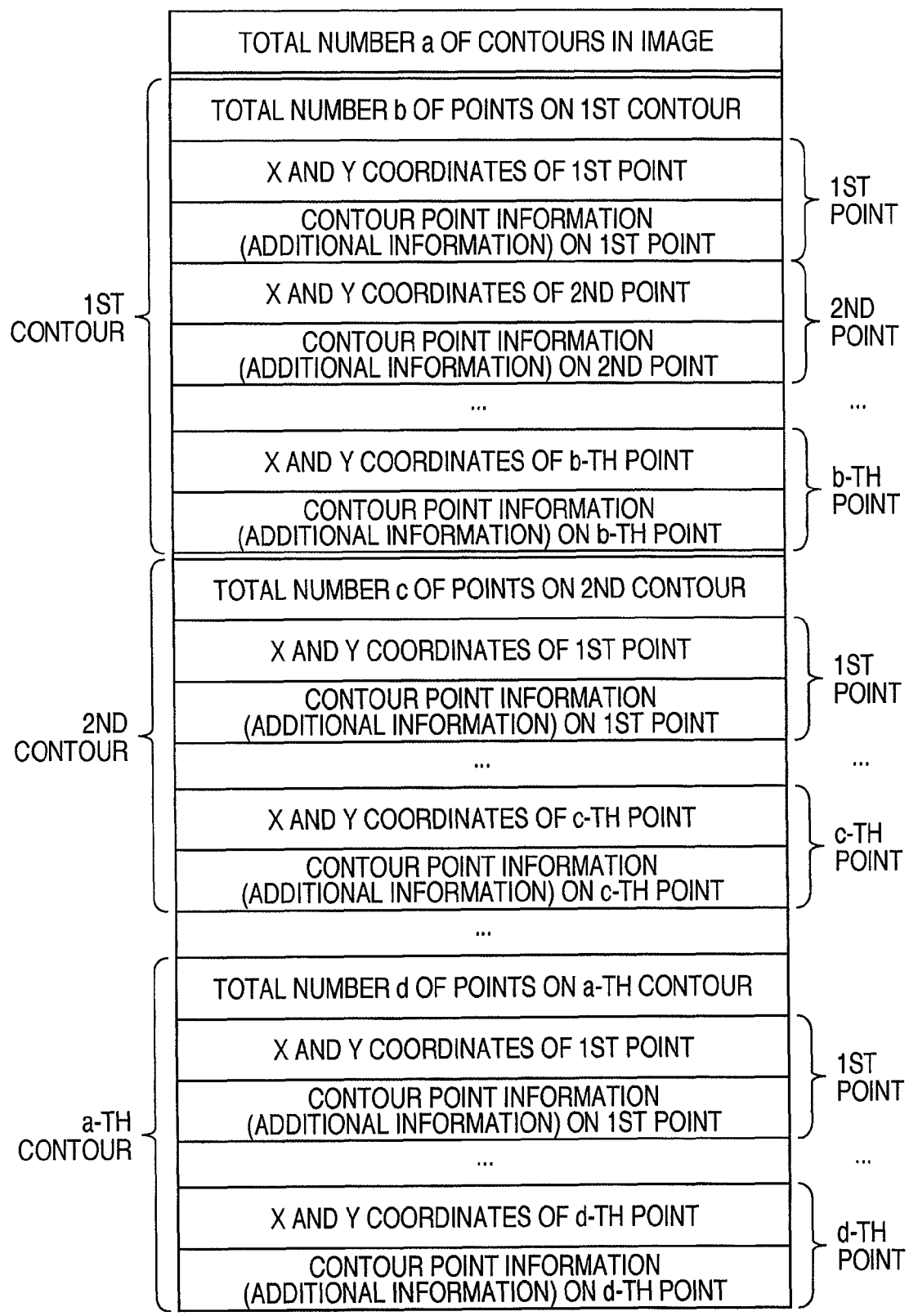
FIG. 30 is a diagram showing an exemplary data format of endpoint-to-endpoint contour vector sequences.

At step S2, the item numbers of the vectors flowing in and out are followed to generate a table that contains the total number of contours in the image, the total number of points on each contour, and the combination of the x and y coordinate of each point on contour and contour point information on the point as shown in FIG. 30.

The process proceeds to step S3, where the table information is stored in the hard disk 522 through the input/output unit 521, then the process will end.

Figure 28:
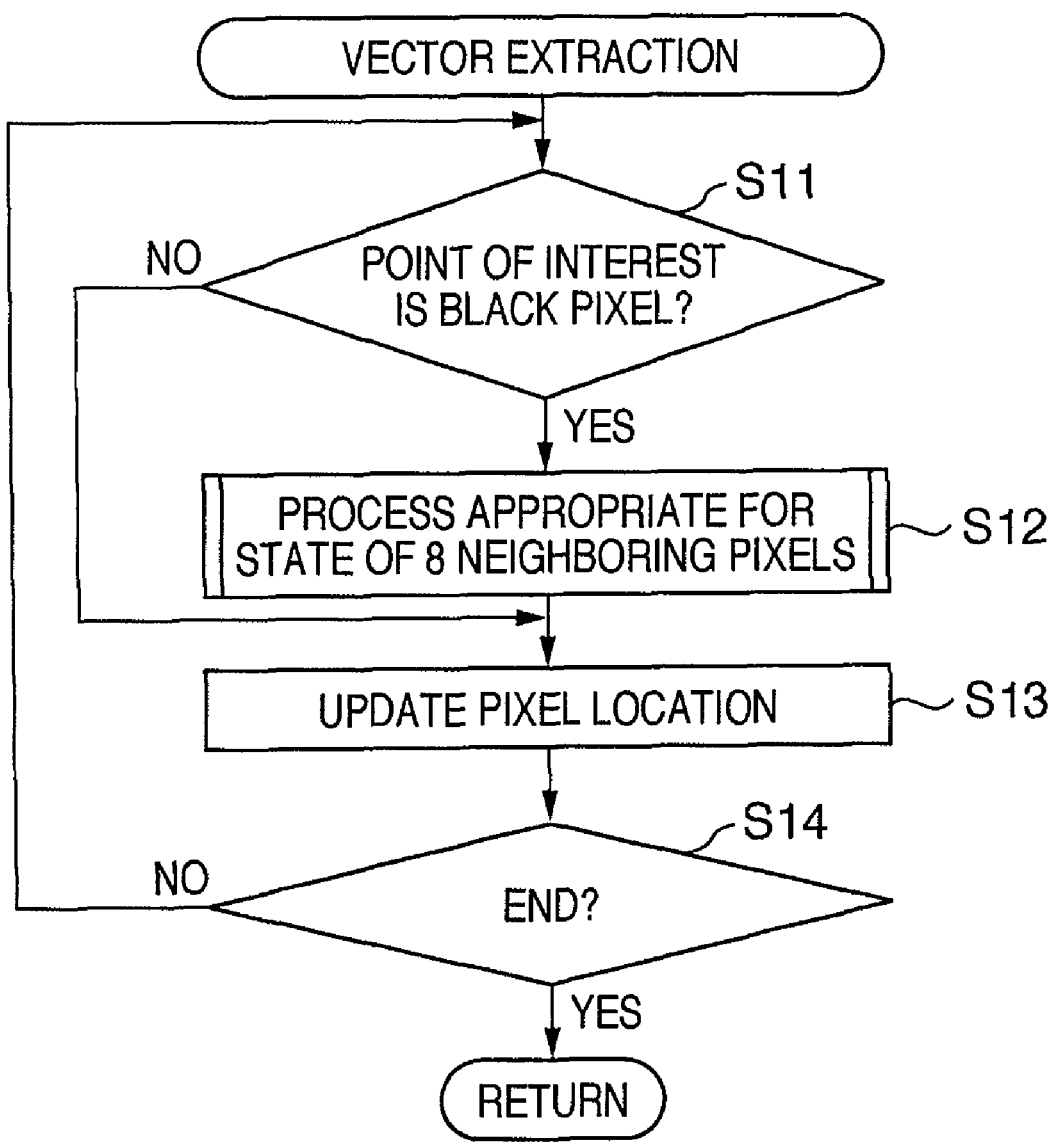
FIG. 28 is a flowchart showing a procedure of the vector sequence extracting process shown in FIG. 27.

FIG. 28 is a flowchart showing the vector sequence extraction processing at step S1 of FIG. 27.

First, a bit 4 (a pixel of interest) at the input port 514 is checked at step S11 to determine whether the pixel of interest is a white or black pixel. If the pixel is a white pixel, the process proceeds to step S13; if the pixel is a black pixel, the process proceeds to step S12.

At step S12, the state of the eight pixels surrounding the pixel of interest is checked and a process routine appropriate for the state is called.

At step S13, an instruction is issued to update the pixel location through the input/output control port 517 as described earlier. Upon input of an update completion signal from the input/output control port 517, the process proceeds to step S14, where determination is made through the input/output control port 517 as to whether processing of the last pixel has been completed. If not, the process returns to step S11 and the next pixel of interest is processed in the same way described above. If completed, the process returns to the initial routine.

Figure 29:
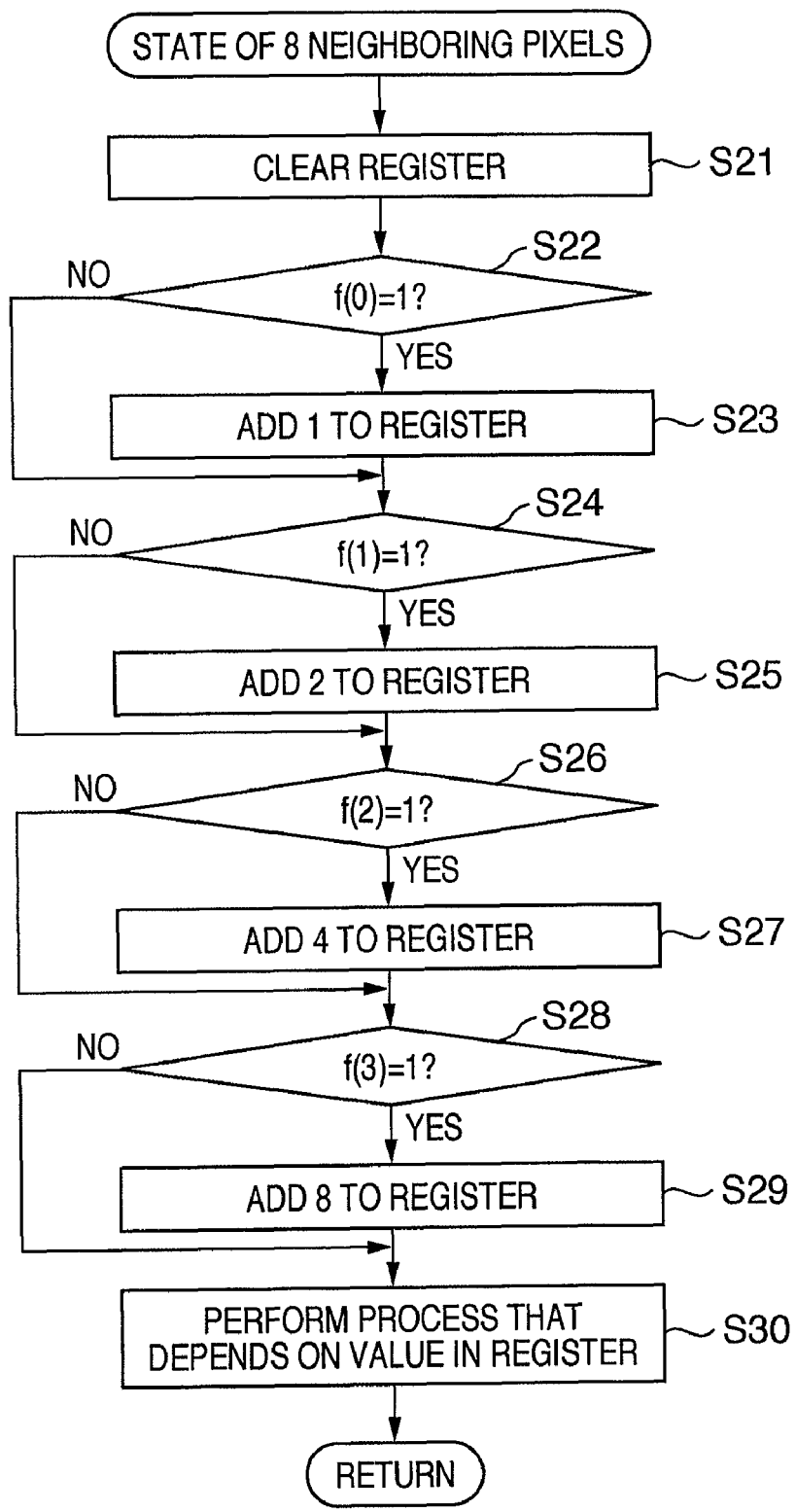
FIG. 29 is a flowchart showing a process procedure that depends on the state of neighboring eight pixels in FIG. 28.

FIG. 29 is a flowchart showing a process performed according to the state of the neighboring pixels at step S12 of FIG. 28.

At step S21, the register of the CPU 519 is cleared to zero.

The process proceeds to step S22. If the pixel at the location denoted by "0" (hereinafter denoted by f (0)) in FIG. 7 is a black pixel (hereinafter represented as "1"), the process proceeds to step S23; if the pixel is a white pixel (hereinafter denoted as "0"), the process proceeds to step S24. At step S23, 1 is added to the register.

The process proceeds to step S24. If the pixel at location "1" in FIG. 7 is a black pixel (f (1)=1), the process proceeds to step S25 and 2 is added to the register. If f (1)=0, the process proceeds to step S26, where determination is made as to whether the pixel at location "2" in FIG. 7 is a black pixel. If f (2)=1, that is, if the pixel is a black pixel, the process proceeds to step S27 and 4 is added to the register.

The process proceeds to step S28, where the pixel at location "3" in FIG. 7 is checked. If f (3)=1, the process proceeds to step S29 and 8 is added to the register; otherwise, the process proceeds to step S30. At step S30, a routine with the process number corresponding to the value held in the register is called.

The register can hold a value in the range from 0 to 15 according to the state of the pixels in the pixel locations "0", "1", "2", and "3" shown in FIG. 7). The process routines associated with these values are shown in FIGS. 11, 12A to 12D, 13A to 13D, 14A to 14D, 15A to 15D, 16A to 16P, 17A to 17D, 18A to 18H, 19A to 19D, 20A to 20D, 21A to 21P, 22A to 22H, 23A to 23D, 24A to 24H, 25A to 25H, and 26.

That is, points on contour and their contour point information described above and defined as shown in FIGS. 11 to 26 are extracted at step S30 as appropriate according to each case. In this way, the endpoint-to-endpoint contour (surround) vector extracting unit 300 can extract endpoint-to-endpoint linear element rough contour vectors and their contour point information from the input 4-connected thin line binary image (line drawing) in a single raster scan and output the result of the processing.

Figure 32:
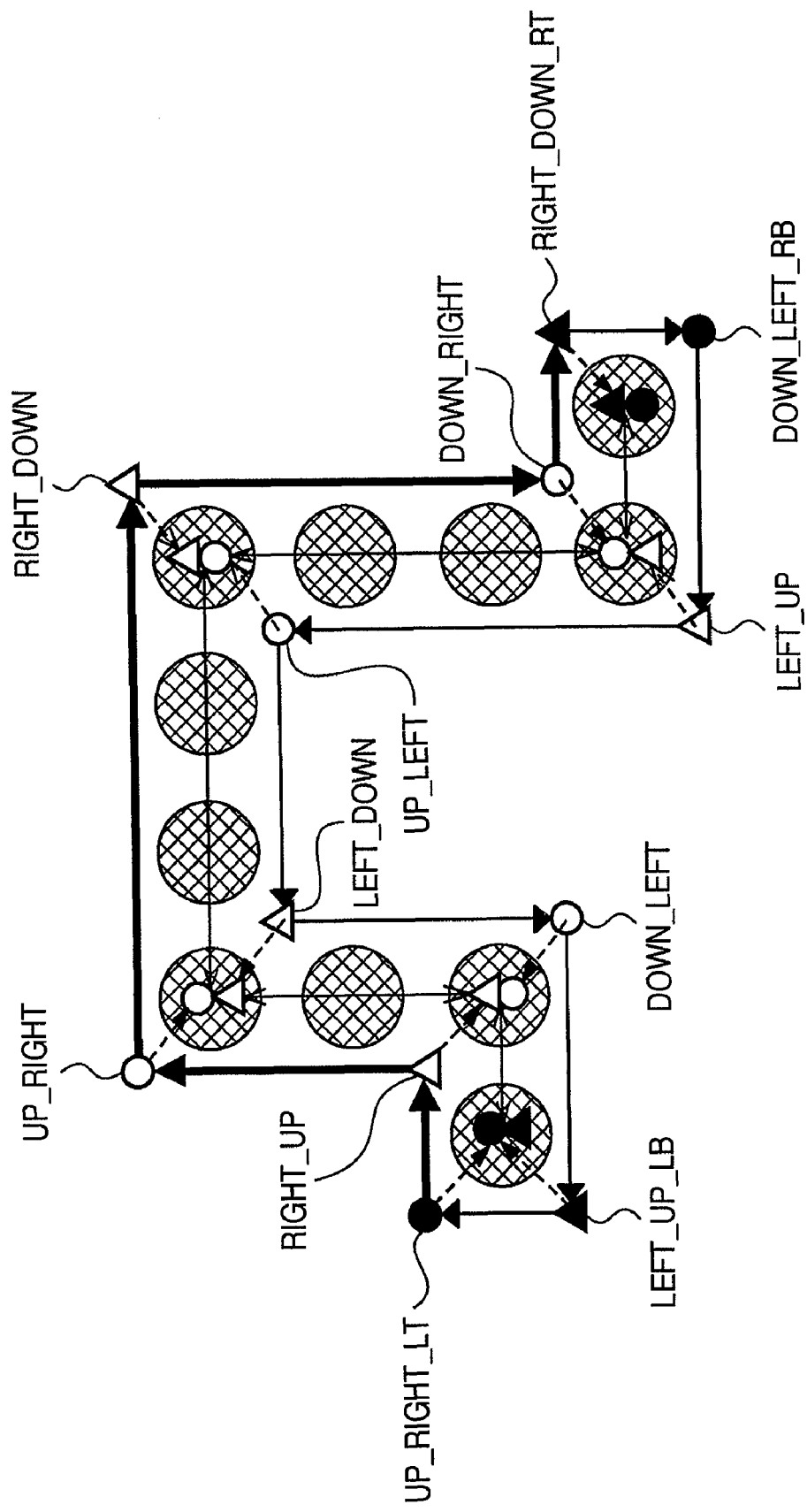
FIG. 32 is a diagram showing linear elements, an endpoint-to-endpoint vector sequence and contour point information, and endpoint-to-endpoint core-line vectors.

They are output in a format as shown in FIG. 30, for example. Each of the sets such as the first, second, and a-th contours shown in FIG. 30 represents a vector sequence extracted from each linear element and contour information is added to each point on contour. FIG. 32 shows an exemplary input line drawing and endpoint-to-endpoint contour (surround) vectors extracted from the line drawing, namely, endpoint-to-endpoint linear element rough contour vectors (a vector sequence represented as thick lines), and contour point information.

Figure 31:
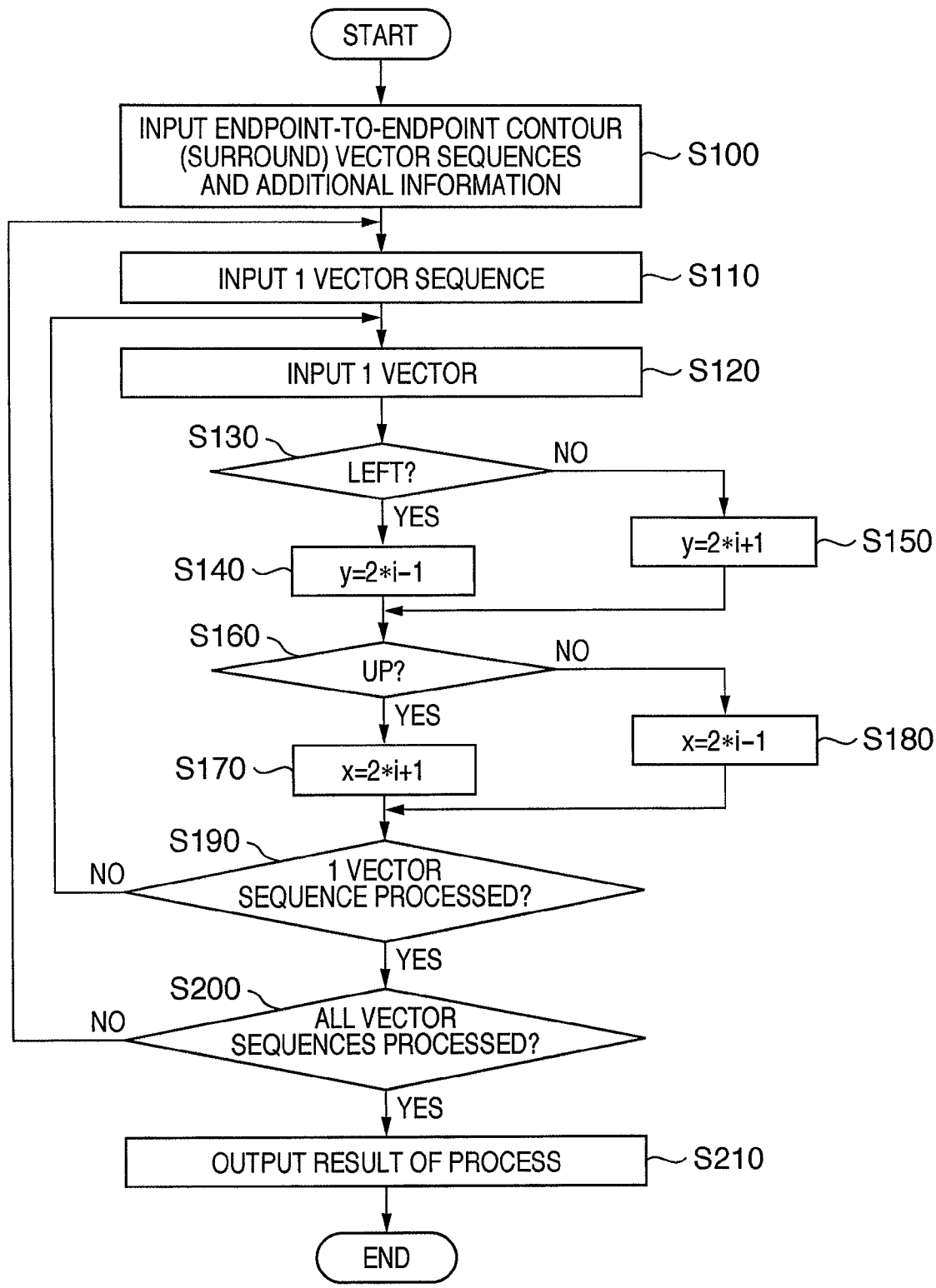
FIG. 31 is a flowchart showing a process procedure performed by an endpoint-to-endpoint core line (surround) vector generating unit.

Operation of the endpoint-to-endpoint core line (surround) vector generating unit 310 will be described next with reference to the flowchart shown in FIG. 31. When the process in FIG. 31 is started, endpoint-to-endpoint contour (surround) vectors are input at step S100. The endpoint-to-endpoint contour (surround) vectors are a set of vector sequences corresponding to independent lines and closed curves connecting endpoints and intersection points (endpoint-to-endpoint linear element rough contour vectors), including information indicating whether the vectors were extracted from portions corresponding to endpoints (intersection points) position in the line drawing. In the present embodiment, the information indicating whether a vector was extracted from a portion corresponding to an endpoint (intersection point) position in a line drawing is also referred to as additional information.

Next, at step S110, one vector sequence (the k-th contour in FIG. 30, where 1≦k≦a) is selected as the current vector sequence to be processed from among the endpoint-to-endpoint contour (surround) vectors input at step S100. The vector sequences are selected in ascending order, one at each iteration of step S110. Here, the endpoint-to-endpoint contour (surround) vectors are input in the form as shown in FIG. 30.

Next, at step S120, a point on contour (the q-th point, where 1≦q≦p, p being the total number of points in the vector sequence) of one vector in the vector sequence input at step S110 is selected as the current point to be processed. The points on contour are selected in ascending order, one at each iteration of step S120.

Next, at step S130, the contour point information on the point on contour selected at step S120 is checked to determine whether any of the vector whose end point is at this point on contour and the vector whose starting point is at this point on contour is a leftward vector or not. If so, the process proceeds to step S140; otherwise the process proceeds to step S150.

At step S140, the contour point y-coordinate (the coordinates are represented as (2i, 2j)) is decremented by 1 (a shift is made by half a pixel toward the origin in the sub scanning direction) and then the process proceeds to step S160.

At step S150, the contour point y-coordinate is incremented by 1 (a shift is made by half a pixel toward the direction opposite to the origin in the sub scanning direction) and then the process proceeds to step S160.

At step S160, the contour point information on the point on contour is checked to determine whether any of the vector whose end point is at the point on contour and the vector whose starting point is at the point on contour is an upward vector. If so, the process proceeds to step S170; otherwise, the process proceeds to step S180.

At step S170, the contour point x-coordinate is incremented by 1 (a shift is made by half a pixel toward the direction opposite to the origin in the main scanning direction) and then the process proceeds to step S190.

At step S180, the contour point x-coordinate is decremented by 1 (a shift is made by half a pixel toward the origin in the main scanning direction) and then the process proceeds to step S190.

At step S190, determination is made as to whether all the points on contour in the vector sequence selected at step S110 have been checked. If so, the process proceeds to step S200; otherwise, the process returns to step S120 to perform steps S130 to S190 on the next point on contour in the same vector sequence.

At step S200, determination is made as to whether all the vector sequences in the endpoint-to-endpoint linear element rough contour vectors input at step S100 have been processed. If so, the process proceeds to step S210; otherwise the process returns to step S110 to perform steps S120 to S200 on the next vector sequence.

At step S210, the result of processing on the endpoint-to-endpoint linear element rough contour vectors input at step S100 is output.

Determinations at steps S130 and S160 are made using the values in the "Value" column in FIGS. 10A and 10B as contour point information, as described below, where the least significant bit (LSB) of binary representation of the values is bit 0 and the most significant bit (MSB) is bit 7. At step S130, bit 5 (the column "Rightward (0), Leftward (1)" in FIGS. 10A and 10B) is checked and, if bit 5 is 0, it is determined that the vector is a rightward vector. If bit 5 is 1, it is determined that the vector is a leftward vector. At step S160, bit 6 (in the column "Upward (0), Downward (1)" in FIGS. 10A and 10B) is checked. If bit 6 is 0, it is determined that the vector is an upward vector; if bit 6 is 1, it is determined that the vector is a downward vector. The additional information on an input endpoint-to-endpoint contour (surround) vector is used to fine-adjust the position of each of single-pixel-wide contour (surround) vectors by half a pixel in an appropriate direction according to the predetermined rule. As a result, an endpoint-to-endpoint core line (surround) vector reduced to a core line having a width of "0" can be generated. The endpoint-to-endpoint core line (surround) vector can be represented in the format as shown in FIG. 30, for example. In the present embodiment, endpoint-to-endpoint core line (surround) vectors are output in the format.

FIG. 32 shows exemplary endpoint-to-endpoint linear element rough contour vectors (the vector sequence represented as thick lines) and endpoint-to-endpoint core line (surround) vectors reduced to a width of "0" based on contour point information (the vector sequence represented as thin lines on the pixels of the input binary image).

Operation of the endpoint-to-endpoint-auxiliary-vector-containing (surround) vector generating unit 320 will be described next. The endpoint-to-endpoint-auxiliary-vector-containing (surround) vector generating unit 320 inserts auxiliary vectors so that the portions corresponding to endpoints are preserved as endpoints (as anchor points of Bezier curves). Consequently, the vectors corresponding to the endpoints can be prevented from being integrated with other vectors to obscure the endpoints when smoothing (function approximation) is applied to the vectors by the endpoint-to-endpoint-auxiliary-vector-containing (surround) vector smoothing unit 330.

The endpoint-to-endpoint smoothed vector identifying (unsurrounding) unit 340 uses the smoothed (function-approximated) endpoint-to-endpoint-auxiliary-vector-containing (surround) vectors obtained from the endpoint-to-endpoint-auxiliary-vector-containing (surround) vector smoothing unit 330. The endpoint-to-endpoint smoothed vector identifying (unsurrounding) unit 340 identifies vectors at the starting endpoint and ending endpoint of each smoothed (surround) vector and generates the starting and ending endpoint information for each smoothed (surround) vector to be used for generating a non-surround vector sequence only between the starting and ending endpoints.

In the present embodiment, the endpoint-to-endpoint-auxiliary-vector-containing (surround) vector smoothing unit 330 is provided as shown in FIG. 1. By providing the unit 330 in this way, a conventional smoothing unit for contour (outline) vectors of binary images that are not necessarily thinned can be used to smooth vectors of a line drawing drawn with only thin lines without considering the thickness of the lines.

A flow of vector smoothing (function approximation) is as follows. First, tangential line segments are extracted from line segments on a rough contour in input contour data, called rough contour data, in which horizontal and vertical vectors extracted from binary raster image data are alternately arranged. Anchor points are extracted from the extracted tangential line segments and quadratic or cubic Bezier curves and straight lines are applied to a group consisting of the line segments between the extracted anchor points or Bezier curve approximation of the group is performed to replace the line segments with a quadratic or cubic Bezier curve.

The method for approximating a function of the points on contour between anchor points as a group on the basis of the anchor point determined is a known basic function approximation method. Anchor points have a characteristic that the positions (coordinates) of the anchor points themselves do not change regardless of whether the segment between the anchor points is approximated to a quadratic or cubic Bezier curve function or a straight line function. The endpoint-to-endpoint-auxiliary-vector-containing (surround) vector generating unit 320 sets one of the endpoints of an endpoint-to-endpoint core line (surround) vector as the starting endpoint and the other as the ending endpoint and inserts an auxiliary vector (auxiliary point on contour) between the starting and ending endpoints so that both points become anchor points.

For example, Japanese Patent Application No. 2005-346137 discloses the following conditions for extracting vectors as tangential line segments.

A first condition is that the vectors before and after a vector of interest are opposite in direction to each other.

A second condition is that the vector lies adjacent to an extracted main tangential line segment and the length L1 of the vector satisfies $L1 \geq \theta 4$.

A third condition is that the length L2 of the vector satisfies $L2 \geq \theta 5$.

Various methods for extracting anchor points have been disclosed. For example, a new point on an extracted tangential line segment is extracted and is set as an anchor point. Since anchor points are extracted at both ends of one tangential line segment, two anchor points are extracted for one tangential line segment. If the two anchor points coincide, only one of them is extracted. If two anchor points are extracted, the segment between the anchor points is automatically becomes a straight line on the object. Various methods for extracting an anchor point for one endpoint on a tangential line segment have been disclosed, such as a method in which when a vector adjacent to a vector that is a tangential line segment of interest is a tangential line segment, the endpoint at the adjacent position is extracted as an anchor point.

The endpoint-to-endpoint-auxiliary-vector-containing (surround) vector generating unit 320 sets one of the endpoints of an endpoint-to-endpoint core line (surround) vector as the starting endpoint and the other as the ending endpoint and inserts an auxiliary point so that both of the endpoints become anchor points.

Figure 33A:
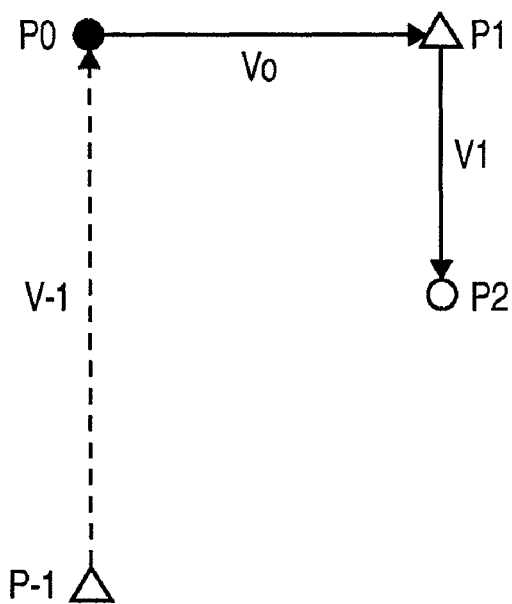
FIGS. 33A and 33B are diagrams illustrating auxiliary points on contour added immediately before a starting endpoint and immediately after ending endpoint.

Referring to FIG. 33A, a method for inserting an auxiliary point on contour P (−1) immediately before an endpoint P (0) to be set as a starting endpoint will be described. The auxiliary point on contour P (−1) is set so that an auxiliary vector V (−1) starting at the auxiliary point on contour P (−1) is opposite in direction to the vector V (1) starting at the point on contour P (1) immediately after the endpoint P (0) to be set as the starting endpoint.

As a result, the vector V (0) becomes a tangential line segment because the first condition described above is fulfilled. The auxiliary vector V (−1) starting at the auxiliary point on contour P (−1) is made long enough to satisfy the third condition for tangential line segment extraction condition described above. With this, the auxiliary vector V (−1) also becomes a tangential line segment. Since both of the auxiliary vector V (−1) and the vector V (0) become tangential line segments, the endpoint P (0) to be set as the starting endpoint can be set as the anchor point. This is based on the condition in the anchor point extracting method that "if a vector adjacent to a vector that is a tangential line segment of interest is a tangential line segment, the endpoint at the adjacent position is set as an anchor point."

Figure 33B:
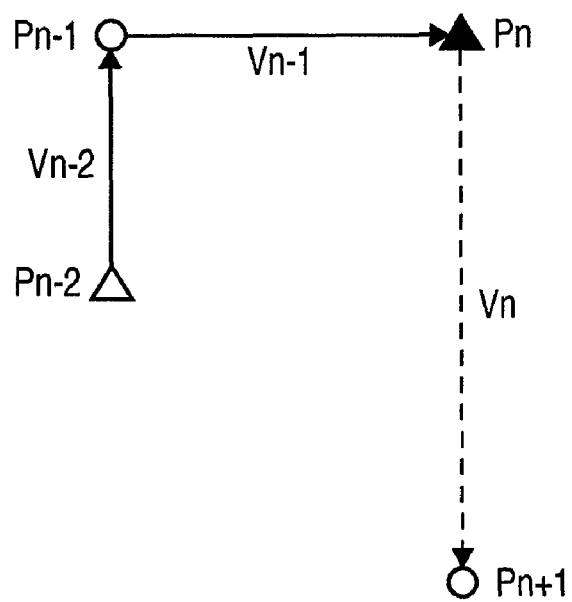

Referring to FIG. 33B, a method for inserting an auxiliary point on contour P (n+1) immediately after an endpoint P (n) to be set as an ending endpoint P (n) will be described next. The auxiliary point on contour P (n+1) is set so that an auxiliary vector V (n) ending at the auxiliary point on contour P (n+1) becomes opposite in direction to a vector V (n−2) ending at the point on contour P (n−1) immediately before the endpoint P (n) to be set as the endpoint. Since this fulfills the first condition for tangential line segment extraction described above, the vector V (n−1) becomes a tangential line segment. The auxiliary point on contour P (n+1) is set in such a manner that the auxiliary vector V (n) ending at the auxiliary point on contour P (n+1) has a length long enough to satisfy the third condition for tangential line segment extraction condition. With this, the auxiliary vector V (n) also becomes a tangential line segment. Since both of the auxiliary vector V (n−1) and the vector V (n) become tangential line segments, the endpoint P (n) to be set as the ending endpoint can be set as the anchor point. This is based on the condition in the anchor point extracting method that "if a vector adjacent to a vector that is a tangential line segment of interest is a tangential line segment, the endpoint at the adjacent position is set as an anchor point."

After the insertion points immediately before the starting endpoint and immediately after the ending endpoint are thus set so that the starting and ending endpoints become anchor points, the insertion points are connected together by a series of horizontal and vertical vectors. In addition, the original contour point sequence running from the starting endpoint to the ending endpoint and a contour point sequence running from the insertion point immediately after the ending endpoint to the insertion point immediately before the starting endpoint and returning to the starting endpoint are generated. Furthermore, starting and ending endpoint information including information for identifying the starting and ending endpoints in the contour point sequences is generated. In the present embodiment, the coordinates of the starting and ending endpoints in the contour point sequences are separately generated as the starting and ending endpoint information.

Figure 34:
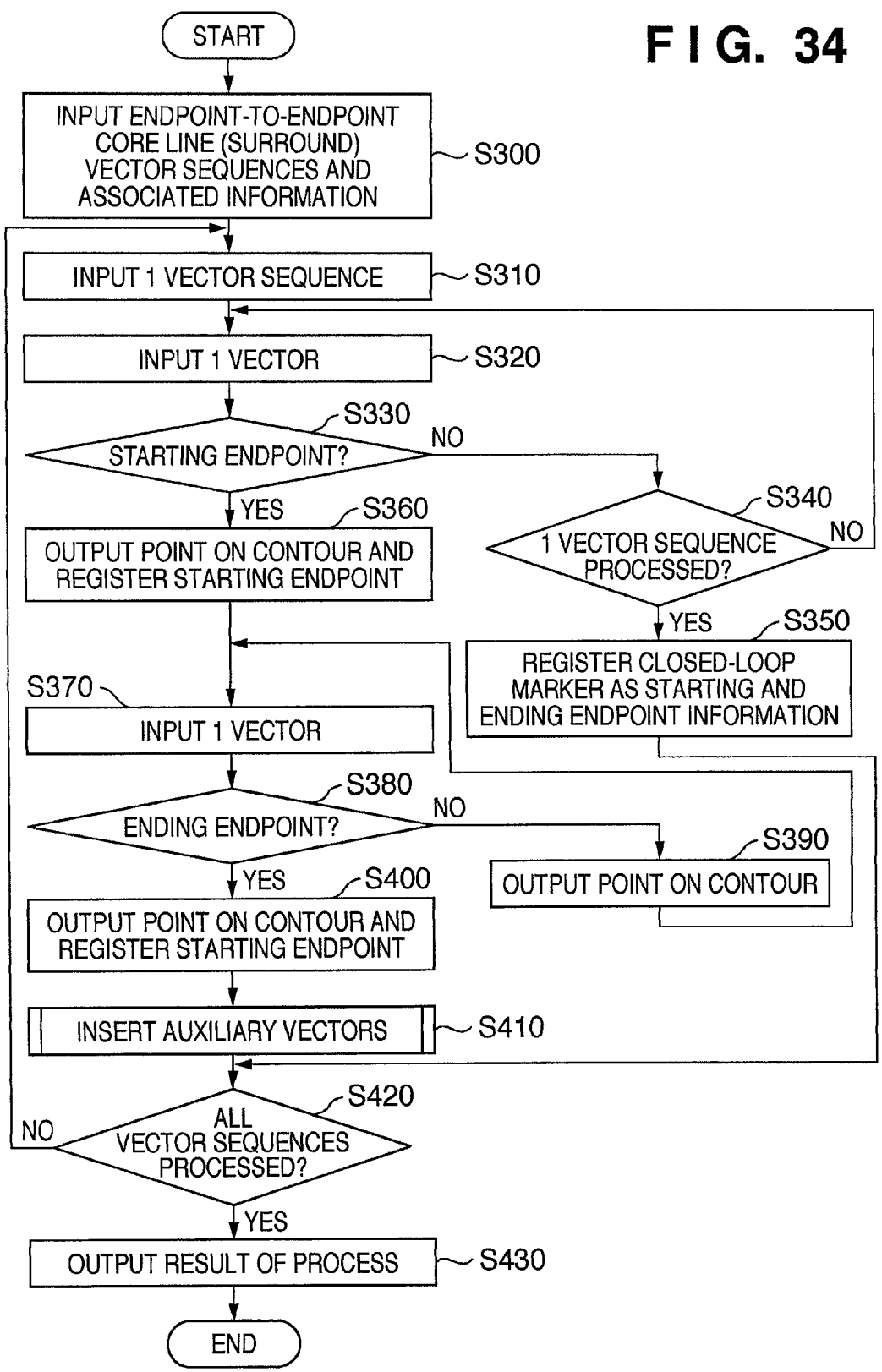
FIG. 34 is a flowchart showing a process procedure performed by an endpoint-to-endpoint-auxiliary-vector-containing (surround) vector generating unit.

Operation of the endpoint-to-endpoint-auxiliary-vector-containing (surround) vector generating unit 320 will be described with reference to the flowchart shown in FIG. 34. When the process in FIG. 34 is started, a 0-pixel-wide endpoint-to-endpoint core line (surround) vector obtained from the endpoint-to-endpoint core line (surround) vector generating unit 310 is input at step S300. At step S310, one vector sequence (for example the k-th contour ($1 \leq k \leq a$) in FIG. 30) is selected as the current vector sequence to be processed from among the endpoint-to-endpoint core line (surround) vectors in a format as shown in FIG. 30 input at step S300.

Next, at step S320, a point on contour (the q-th point, where $1 \leq q \leq p$) in the vector sequence selected at step S310 (the total number of points is denoted by p) is selected as the current point on contour to be processed. The first to p-th points are selected in ascending order as the current point to be processed, one at each iteration of step S320, until the starting endpoint is found at step S330.

Next, at step S330, contour point information on the point on contour selected at step S320 is checked to determine whether the point on contour is a vector to be set as the starting endpoint. If so, the process proceeds to step S360; otherwise, the process proceeds to step S340. The determination as to whether the point on contour is a vector to be selected as the starting endpoint or not is made with reference to the contour point information associated with the point on contour. For example, the determination may be made on the basis of whether the point on contour is any of UP_RIGHT_LT (18H), DOWN_LEFT_RB (78H), LEFT_UP_BL (B8H), and RIGHT_DOWN_TR (D8H) in FIGS. 10A and 10B. Alternatively, the determination may be made on the basis of whether both of bit 3 and bit 4 of the value in the column "Value" in FIGS. 10A and 10B are 1.

At step S340, determination is made as to whether all vectors in one vector sequence in the endpoint-to-endpoint core line (surround) vectors input at step S310 have been processed. If not, the process returns to step S320 to make determination at step S320 for the next vector in the vector sequence. On the other hand, if all vectors have been processed, a possible starting endpoint is not contained in the vector sequence input at step S310 and therefore the process proceeds to step S350.

Figure 38A:
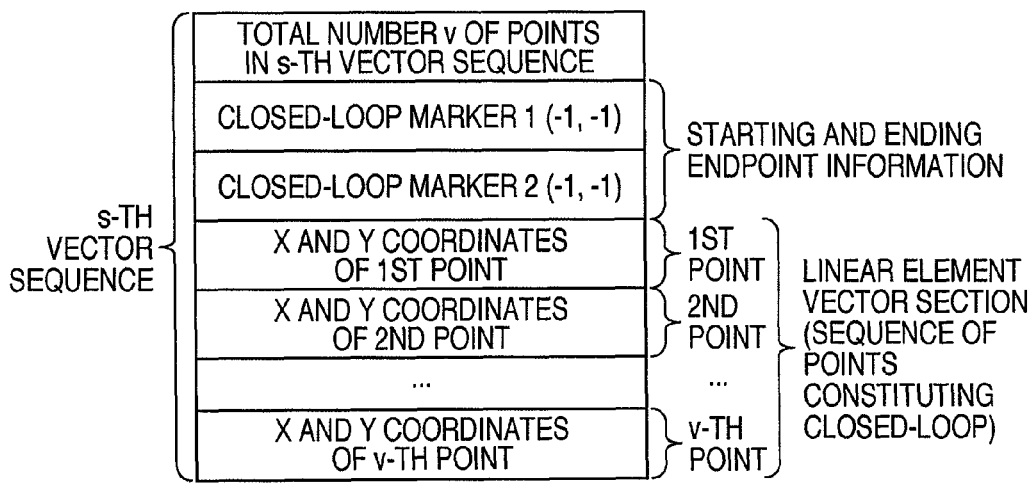
FIGS. 38A and 38B are diagrams showing exemplary data formats of vectors including endpoint-to-endpoint auxiliary vectors and endpoint-to-endpoint smoothed vectors.

At step S350, a closed-loop marker indicating that the vector sequence is a closed loop without an endpoint is assigned to the vector sequence and the vectors in the vector sequence are directly output along with the closed-loop marker. The data format is shown in FIG. 38A. In the example in FIG. 38A, the s-th vector sequence is the current vector sequence to be processed and v vectors are contained in the vector sequence. Impossible endpoint coordinates (−1, −1) are assigned as the closed-loop marker and output as starting and ending endpoint information for two points. After completion of step S350, the process proceeds to step S420.

At step S360, the point on contour is registered as a starting endpoint and is output as one vector between the starting and ending endpoints. Then the process proceeds to step S370.

At step S370, as in step S320, a point on contour subsequent to the point on contour (the q-th point, where $1 \leq q \leq p$) in one vector in the vector sequence selected at step S310 (the total number of points is denoted by p) that was selected at step S320 is selected as the current point on contour to be processed. Points subsequent to the point on contour selected at step S320 are selected one by one in ascending order toward the p-th point. After one is selected, the process proceeds to step S380.

At step S380, the contour point information associated with the contour point selected at step S370 is checked to determine whether the point on contour is on a vector to be set as an ending endpoint. If so, the process proceeds to step S400; otherwise, the process proceeds to step S390. The determination as to whether the point on contour is a on a vector to be set as an ending endpoint is made with reference to the contour point information on the point on contour. For example, the determination may be made on the basis of whether the point on contour is any of UP_RIGHT_TL (08H), DOWN_LEFT_BR (68H), LEFT_UP_LB (A8H), and RIGHT_DOWN_RT (C8H) in FIGS. 10A and 10B. Alternatively, the determination may be made on the basis of whether both of bit 3 and bit 4 of the value in the column "Value" in FIGS. 10A and 10B are 0 and 1, respectively.

At step S390, the point on contour is output as one vector between the starting endpoint and ending endpoint and then the process returns to step S370.

At step S400, the point on contour is registered as an ending endpoint and is output as one vector between the starting endpoint and ending endpoints. Then the process proceeds to step S410.

At step S410, since both of the starting and ending endpoints of the vector sequence have been determined and vectors between the starting and ending endpoints have been output, auxiliary vectors to be inserted between the ending and starting endpoints are obtained. The processing at step S410 will be described later in further detail with reference to the flowchart shown in FIG. 35 and to FIGS. 36 and 37. After completion of step S410, the process proceeds to step S420.

At step S420, determination is made as to whether all vector sequences in the endpoint-to-endpoint core line (surround) vectors input at step S300 have been processed. If so, the process proceeds to step S430; otherwise, the process returns to step S310 to perform steps S320 to S420 for the next vector sequence.

At step S430, the result of processing of the endpoint-to-endpoint core line (surround) vectors input at step S300 is output.

Figure 38B:
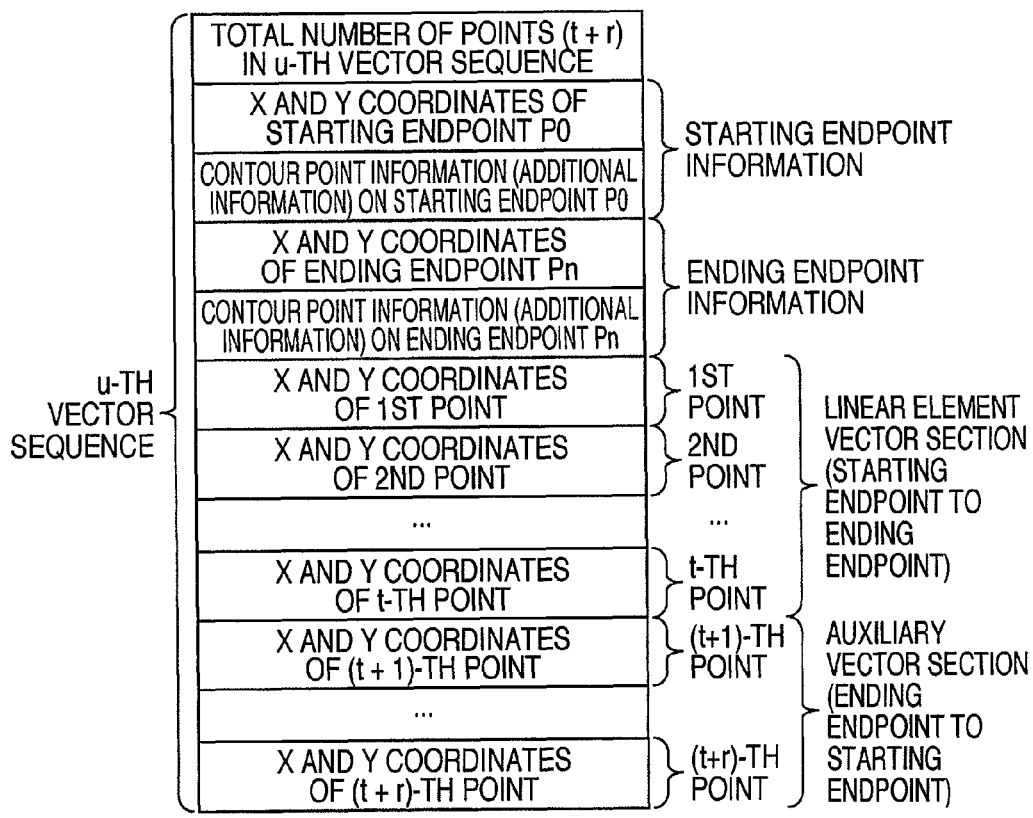

FIG. 38B shows an example of an output which is output when both of the starting and ending endpoints for the vector sequence of interest have been determined and the vectors between the starting and ending endpoints and auxiliary vectors to be inserted between the ending and starting endpoints have also been determined. In the example in FIG. 38B, the vector sequence of interest is the u-th vector sequence, t vectors are between the starting and ending endpoints of the vector sequence, including the starting and ending endpoints, and r auxiliary vectors are inserted between the ending and starting endpoints. Here, the first point is the starting endpoint and the t-th point is the ending endpoint.

Referring to the flowchart shown in FIG. 35, the processing at step S410 of the flowchart shown in FIG. 34 will be described in further detail. As stated above, the starting and ending endpoints of the vector sequence have been determined and the vectors between the starting and ending endpoints have been output. At step S410, the auxiliary vectors to be inserted between the ending and starting endpoints will be obtained.

Figure 35:
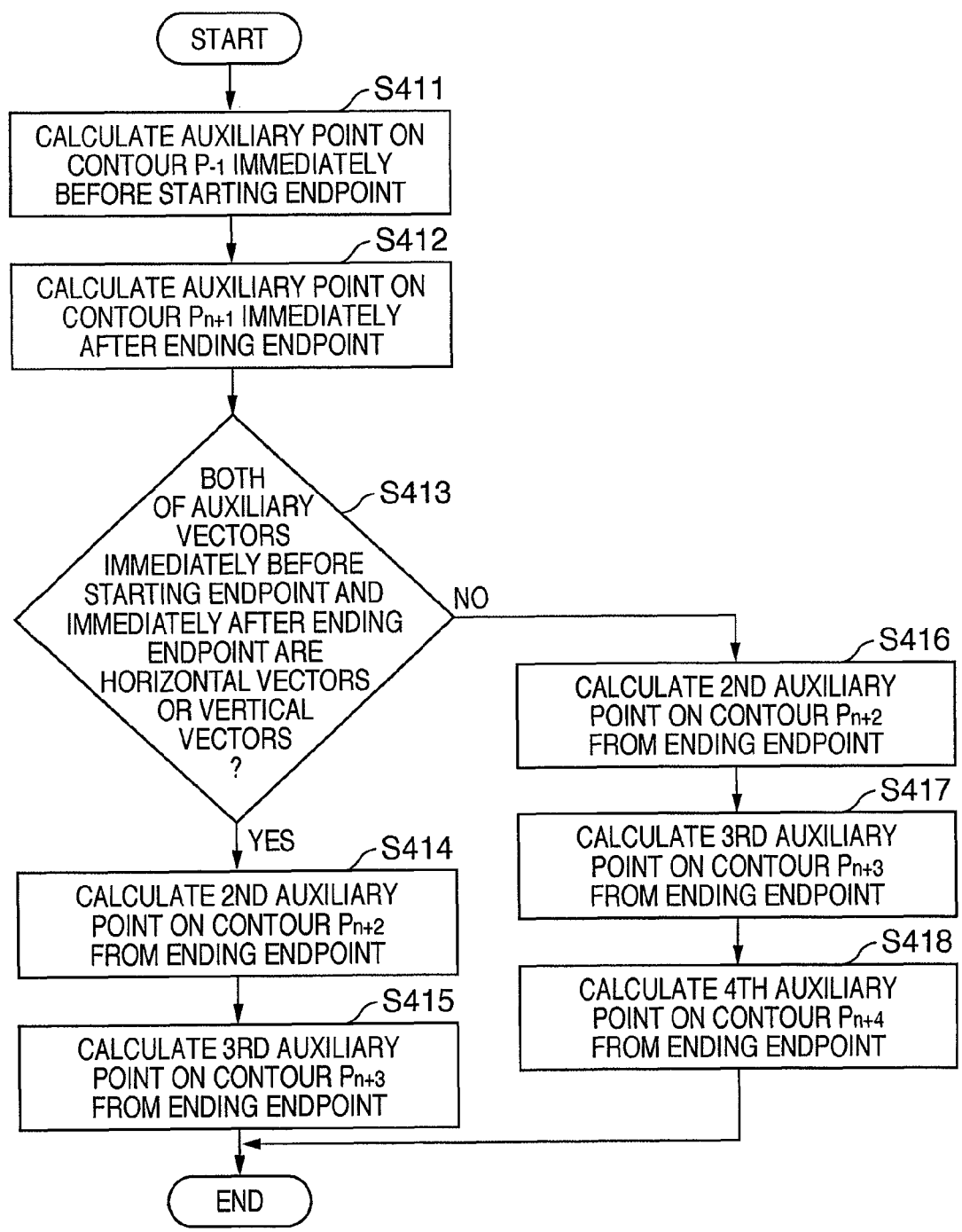
FIG. 35 is a flowchart showing a process procedure for inserting auxiliary vectors in FIG. 34.

When process in FIG. 35 is started, the coordinates of an auxiliary point on contour P (−1) to be inserted immediately before the endpoint P (0) to be set as the starting endpoint are calculated at step S411 as has been described with reference to FIG. 33A. That is, the auxiliary point on contour P (−1) is set so that an auxiliary vector V (−1) starting at the auxiliary point on contour P (−1) is opposite in direction to the vector V (1) starting at the point on contour P (1) immediately after the endpoint P (0) to be set as the starting endpoint. The auxiliary point on contour P (−1) is determined so that the auxiliary vector V (−1) starting at the auxiliary point on contour P (−1) has a length long enough (for example 10 pixels or longer) to fulfill the third condition for tangential line segment extraction described above.

The process proceeds to step S412. At step S412, the coordinates of an auxiliary point on contour P (n+1) to be inserted immediately after the endpoint P (n) to be set as the ending endpoint is obtained as has been described with reference to FIG. 33B. That is, the auxiliary point on contour P (n+1) is determined in such a manner that an auxiliary vector V (n) ending at the auxiliary point on contour P (n+1) becomes opposite in direction to the vector V (n−2) ending at the point on contour P (n−1) immediately before the endpoint P (n) to be set as the ending endpoint. The auxiliary point on contour P (n+1) is determined so that the auxiliary vector V (n) ending at the auxiliary point on contour P (n+1) has a length long enough (for example 10 pixels or longer) to fulfill the third condition for tangential line segment extraction described above. After completion of step S412, the process proceeds to step S413.

At step S413, determination is made as to whether the auxiliary vector V (−1) obtained at step S411 and the auxiliary vector V (n) are both horizontal vectors or both vertical vectors. The auxiliary vector V (−1) is an auxiliary vector starting at the auxiliary point on contour P (−1) to be inserted immediately before the endpoint P (0) to be set as the starting endpoint. The auxiliary vector V (n) ends at the auxiliary point on contour P (n+1) to be inserted immediately after the endpoint P (n) to be set as the ending endpoint. If it is determined that both auxiliary vectors are horizontal vectors or vertical vectors, the process proceeds to step S414; otherwise, the process proceeds to step S416.

Figure 36:
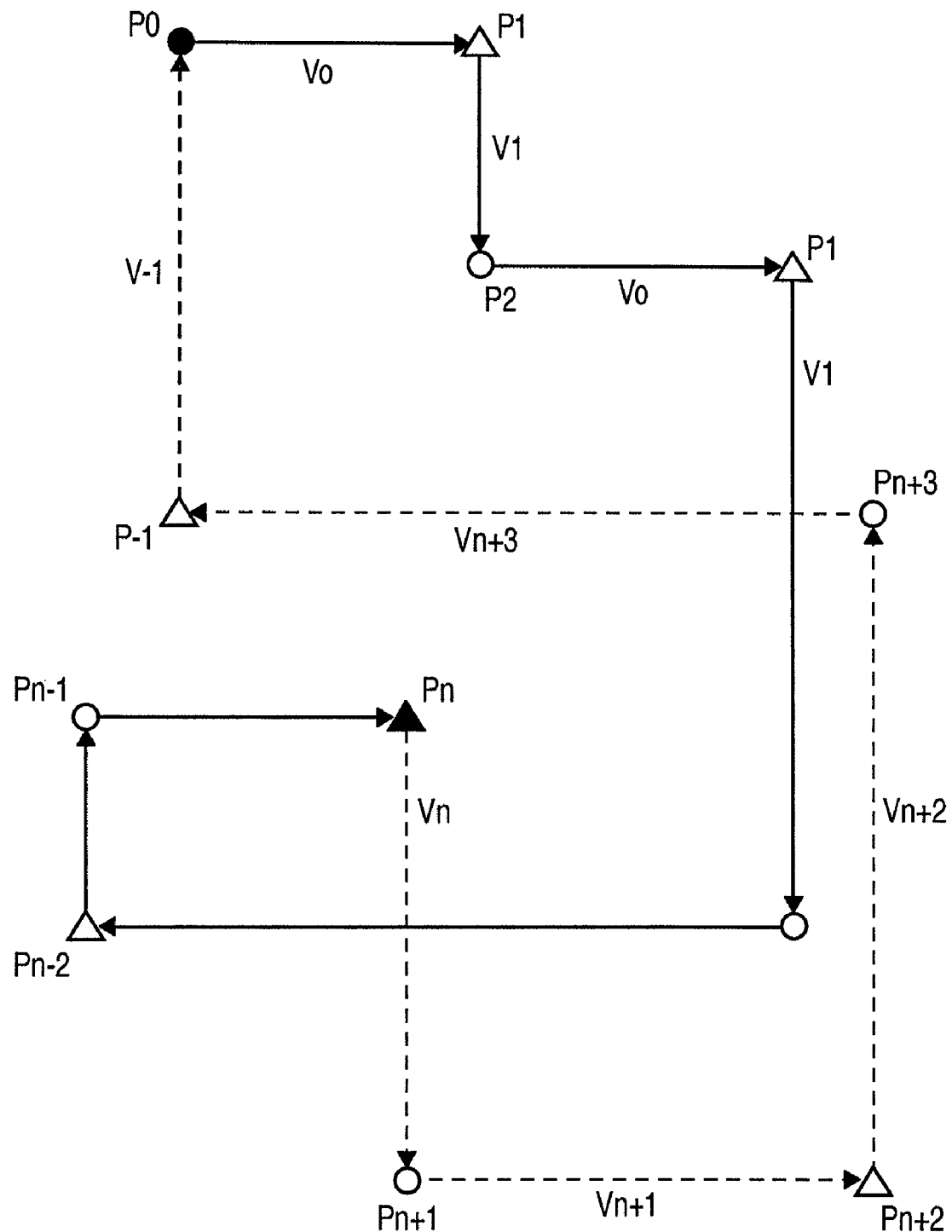
FIG. 36 is a first diagram illustrating a process for inserting auxiliary vectors.

Step S414 is performed if both auxiliary vectors V (−1) and V (n) are horizontal vectors or both are vertical vectors. An example is shown in FIG. 36. At step S414, the auxiliary point on contour P (n+2) after the next endpoint P (n) to be set as the ending endpoint is set at a distance from P (n) long enough (for example 10 pixels or more) to fulfill the third condition for tangential line segment extraction in the direction away from P (−1). Then the process proceeds to step S415.

Like step S414, step S415 is performed if the auxiliary vectors V (−1) and V (n) are both horizontal vectors or both vertical vectors. At step S415, the third point P (n+3) from the endpoint P (n) to be set as the ending endpoint P (n) (which is also the second auxiliary point on contour from the endpoint P (0) to be set as the starting point) is determined so that horizontal and vertical vectors are alternately connected to connect the point P (n+2) to P (−1). With this, the sequence of the steps for inserting auxiliary points on contour ends and the process returns to S420 of the flowchart in FIG. 34.

Figure 37:
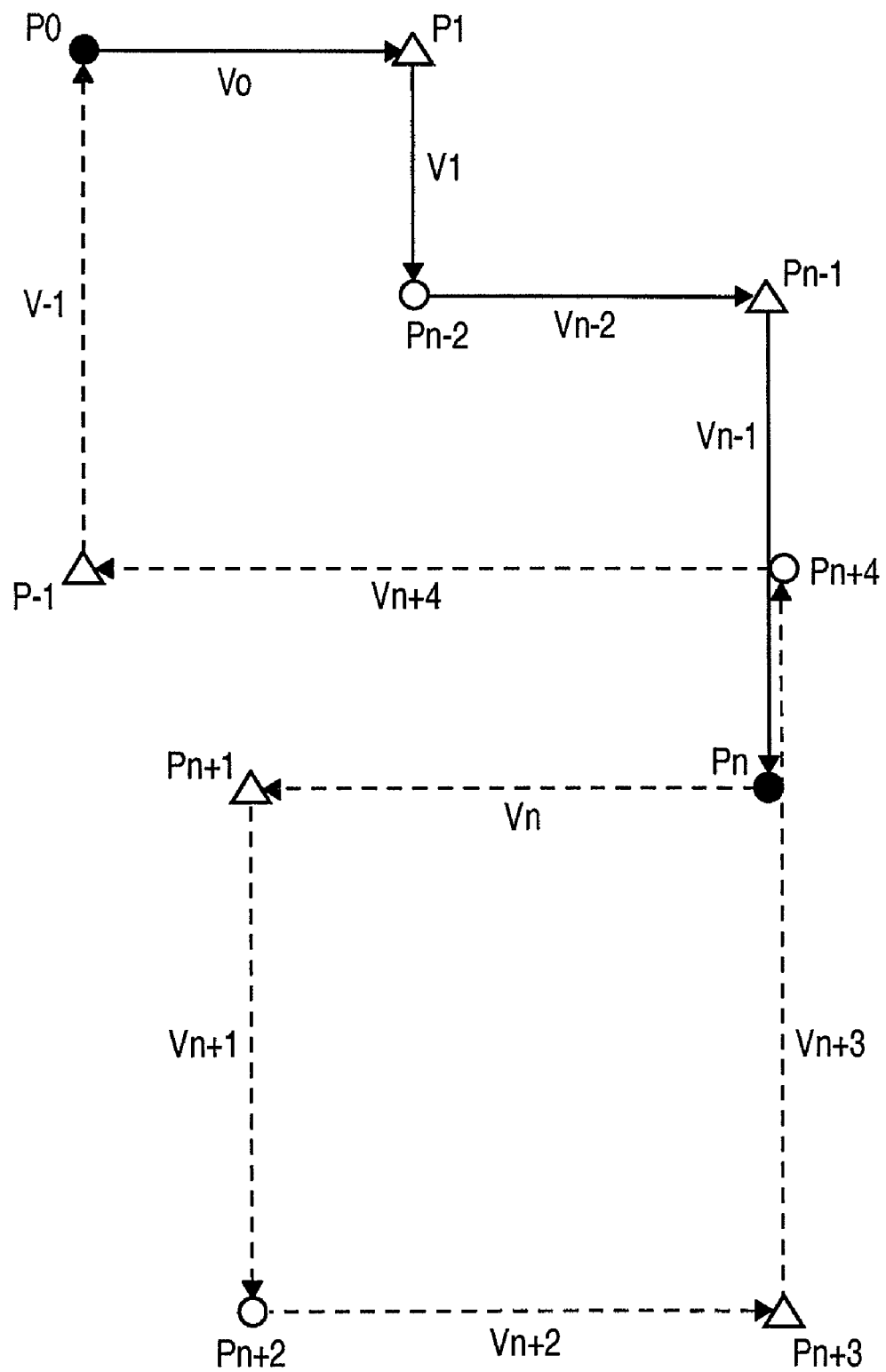
FIG. 37 is a second diagram illustrating a process for inserting auxiliary vectors.

On the other hand, step S416 is performed if one of the auxiliary vectors V (−1) and V (n) is a horizontal vector and the other is a vertical vector. An example is shown in FIG. 37. At step S416, the second auxiliary point on contour P (n+2) from the endpoint P (n) to be set as the ending endpoint is set at a distance from the P (n+1) long enough (for example 10 pixels or more) to fulfill the third condition for tangential line segment extraction in the direction away from P (−1). Then the process proceeds to step S417.

Like step S416, step S417 is performed if one of the auxiliary vectors V (−1) and V (n) is a horizontal vector and the other is a vertical vector. At step S417, a point P (n+3) is set at a distance long enough (for example 10 pixels or more) from P (n+2) to fulfill the third condition for tangential line segment extraction in the direction away from P (−1). Then the process proceeds to step S418.

Like steps S416 and S417, step S418 is performed if one of the auxiliary vectors V (−1) and V (n) is a horizontal vector and the other is a vertical vector. At step S418, the fourth auxiliary point on contour P (n+4) from the endpoint P (n) to be set as the ending endpoint is determined so as to connect P (n+3) to P (−1) in such a manner that horizontal and vertical vectors are alternately connected. Here, the auxiliary point on contour is also the auxiliary point on contour before the auxiliary point previous to the endpoint P (0) to be set as the starting endpoint. With this, the sequence of steps for inserting auxiliary points ends and the process returns to step S420 of the flowchart in FIG. 34.

The endpoint-to-endpoint-auxiliary-vector-containing (surround) vector generating unit 320 receives endpoint-to-endpoint core line (surround) vectors from the endpoint-to-endpoint core line (surround) vector generating unit 310 and inserts auxiliary vectors to generate endpoint-to-endpoint auxiliary-vector-containing (surround) vectors. This prevents the vectors corresponding to endpoint portions from being integrated with another vector to obscure the endpoint locations when smoothing (function approximation) processing is performed by the endpoint-to-endpoint-auxiliary-vector-containing (surround) vector smoothing unit 330. That is, the portions corresponding to endpoints can be preserved (become anchor points of Bezier curves).

In addition, the endpoint-to-endpoint-auxiliary-vector-containing (surround) vector generating unit 320 also generates starting and ending endpoint information indicating the vectors corresponding to endpoint portions for each endpoint-to-endpoint-auxiliary-vector containing (surround) vector for which an auxiliary vector is inserted. The result of the process generated can be represented in the format shown in FIG. 30, for example, in which the contour data is replaced with the vector sequence data shown in FIGS. 38A and 38B. In the present embodiment, the result is output in this format.

By providing the endpoint-to-endpoint auxiliary-vector-containing (surround) vector smoothing unit 330, a smoothed (function-approximated) endpoint-to-endpoint-auxiliary-vector-containing (surround) vector is generated for each (surround) vector with the portions corresponding endpoints being preserved. The resulting vectors are output to the endpoint-to-endpoint smoothed vector identifying (unsurrounding) unit 340 which performs processing at the next step. At the same time, the starting and ending endpoint information generated by the endpoint-to-endpoint-auxiliary-vector-containing (surround) vector generating unit 320 is also directly output to the endpoint-to-endpoint smoothed vector identifying (unsurrounding) unit 340.

The endpoint-to-endpoint smoothed vector identifying (unsurrounding) unit 340 receives the smoothed (function-approximated) endpoint-to-endpoint-auxiliary-vector-containing (surround) vectors and starting and ending endpoint information. Here, the smoothed (function-approximated) endpoint-to-endpoint-auxiliary-vector-containing (surround) vectors are obtained from the endpoint-to-endpoint-auxiliary-vector-containing (surround) vector smoothing unit 330. The staring and ending endpoint information is obtained from the endpoint-to-endpoint-auxiliary-vector-containing (surround) vector generating unit 320. The endpoint-to-endpoint smoothed vector identifying (unsurrounding) unit 340 compares the coordinates of each vector in each of the smoothed (surround) vectors with the coordinates of points on contour that are starting and ending endpoints to identify and generate a non-surround vector sequence only of the section between the starting and ending endpoints as an endpoint-to-endpoint smoothed (non-surround) vector.

The result of the processing generated can be represented in a format similar to the format shown in FIGS. 38A and 38B, except that each point on contour has additional information, which is attribute information indicating whether the point is an anchor point or not, in the contour point information section. The auxiliary vector section in FIG. 38B is not required at this moment. If the vector sequence is not a closed loop, starting and ending endpoint information generated by the endpoint-to-endpoint-auxiliary-vector-containing (surround) vector generating unit 320 is held for the starting and ending endpoints. In the present embodiment, the result in such format is output to the endpoint coordinate correcting unit 345.

Figure 42:
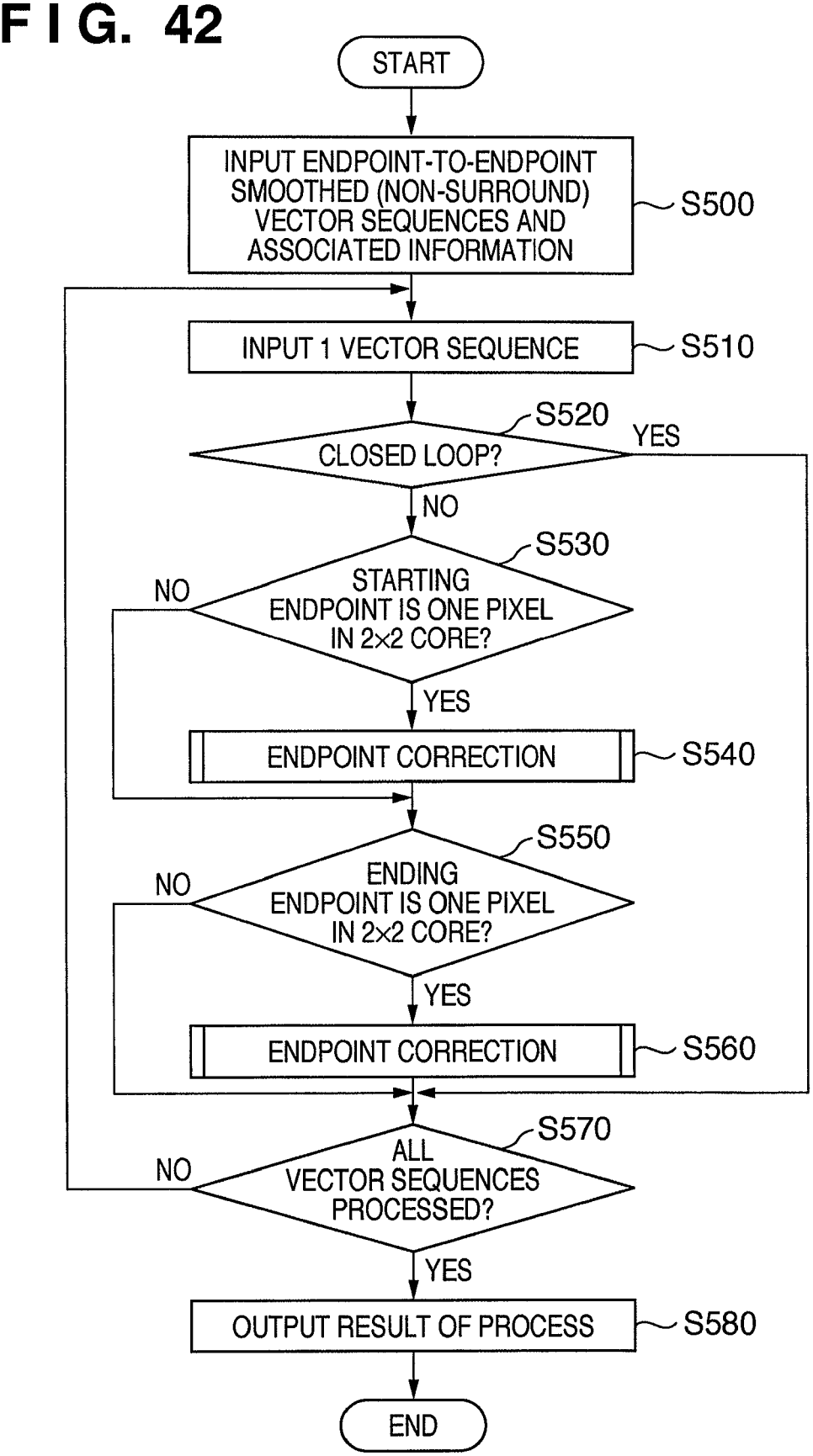
FIG. 42 is a flowchart showing a process procedure performed by the endpoint coordinate correcting unit.

Referring to the flowchart shown in FIG. 42, operation of the endpoint coordinate correcting unit 345 will be described next. When the process in FIG. 42 is started, endpoint-to-endpoint smoothed (non-surround) vectors are input from the endpoint-to-endpoint smoothed vector identifying (unsurrounding) unit 340 at step S500.

At step S510, one vector sequence is selected from the endpoint-to-endpoint smoothed (non-surround) vectors of the format shown in FIG. 38A input at step S500 as the current vector sequence to be processed.

At step S520, the starting and ending endpoint information is checked to determine whether the current vector sequence is a closed loop. If the vector sequence is a closed loop, the process proceeds to step S570; otherwise, the process proceeds to step S530.

At step S530, the additional information on the starting endpoint is checked to determine whether the endpoint is one pixel in a 2-pixel×2-pixel core. In particular, the 3 LSB of the value in the column "Value" in FIGS. 10A and 10B (the 3 bits are indicated in the column "Direction of correction" and are hereinafter also referred to as correction information) are checked to determine whether the 3 bits represent non-zero (a value other than "000" in binary notation), that is, whether the 3 bits represent a value in the range from 1 to 4 (any of "001", "010", "011", and "100" in binary notation). If the 3 bits do not represent 0, it is determined that the starting endpoint is one pixel in a 2×2 core, and the process proceeds to step S540; otherwise, the process proceeds to step S550.

At step S540, endpoint correction is performed and then the process proceeds to step S550.

At step S550, the additional information on the ending endpoint is checked to determine whether the endpoint is one pixel in a 2-pixel×2-pixel core, in the same way as the determination for the starting endpoint at step S530. If it is determined that the ending endpoint is one pixel in a 2-pixel×2-pixel core, the process proceeds to step S560; otherwise, the process proceeds to step S570.

At step S560, endpoint correction is performed as in the step S540 and then the process proceeds to step S570. The endpoint correction at steps S540 and S560 will be described later.

At step S570, determination is made as to whether all vector sequences in the endpoint-to-endpoint-smoothed (non-surround) vectors obtained at step S500 have been processed. If not, the process returns to step S510 and starts the sequence of the process steps for the next vector sequence. If all the vector sequences have been processed, the process proceeds to step S580.

At step S580, the result of the process thus generated is output on the smoothed vector output unit 350 as a file, or is output to an external device through the communication interface 4 or the like.

Again, the result of the process generated can be represented in a format similar to the format shown in FIG. 30, except that each point on contour has additional information, which is attribute information indicating whether the point is an anchor point or not, in the contour point information section. In the present embodiment, the result is output in such format.

Figure 43:
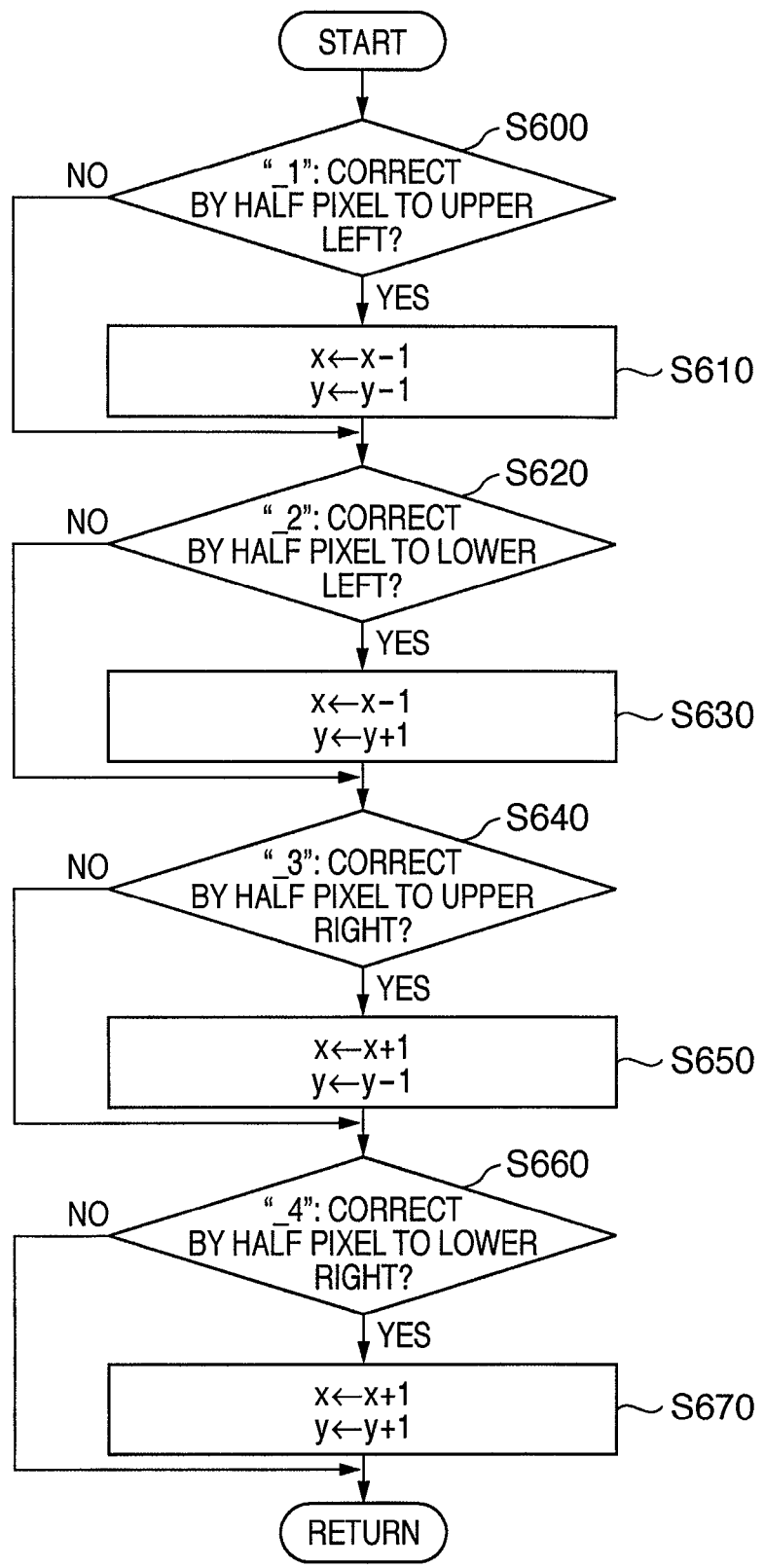
FIG. 43 is a flowchart showing a procedure of the endpoint correcting process in FIG. 42.

The process of the endpoint correction used at steps S540 and S560 will be described next in detail with reference to the flowchart in FIG. 43. When the process in FIG. 43 is started, additional information associated with the endpoint of interest is checked at step S600 to determine whether the endpoint is to be corrected by half a pixel to the upper left. If so, the process proceeds to step S610; otherwise, the process proceeds to step S620.

The determination for the additional information of the endpoint is made by checking the 3 LSB of the value in the column "Value" shown in FIGS. 10A and 10B (the 3 bits are indicated in the column "Direction of correction") represent 1 ("001" in binary notation). If so, it indicates that the starting endpoint is one pixel in a 2-pixel×2-pixel core and it is determined that the point is to be corrected by half a pixel to the upper left.

At step S610, a value equivalent to half a pixel length is subtracted from the x-coordinate of the coordinates (x, y) of the endpoint of interest and a value equivalent to half a pixel length is subtracted from the y-coordinate. That is, the coordinate system described earlier is used, one pixel length is treated as "2" for convenience, and the following calculations are performed:

$$x \leftarrow x-1 \quad (1)$$

$$y \leftarrow y-1 \quad (2)$$

At step S620, the additional information associated with the endpoint of interest is checked to determine whether the endpoint is to be corrected by half a pixel to the lower left. If so, the process proceeds to step S630; otherwise, the process proceeds to step S640. The determination is made by checking the additional information associated with the endpoint to determine whether the 3 LSB of the value in the column "Value" shown in FIGS. 10A and 10B (the 3 bits are indicated in the column "Direction of correction") represent 2 ("010" in binary notation). If so, it indicates that the starting endpoint is one pixel in a 2-pixel×2-pixel core and it is determined that the endpoint is to be corrected by half a pixel to the lower left.

At step S630, a value equivalent to half a pixel length is subtracted from the x-coordinate of the coordinates (x, y) of the endpoint of interest and a value equivalent to half a pixel length is added to the y-coordinate. That is, the coordinate system described earlier is used, one pixel length is treated as "2" for convenience, and the following calculations are performed:

$$x \leftarrow x-1 \quad (3)$$

$$y \leftarrow y+1 \quad (4)$$

At step S640, the additional information associated with the endpoint of interest is checked to determine whether the endpoint is to be corrected by half a pixel to the upper right. If so, the process proceeds to step S650; otherwise, the process proceeds to step S660. The determination is made by checking the 3 LSB of the value in the column "Value" shown in FIGS. 10A and 10B (the 3 bits are indicated in the column "Direction of correction") to determine whether the 3 bits represent 3 ("011" in binary notation). If so, it indicates that the starting endpoint is one pixel in a 2-pixel×2-pixel core and it is determined that the endpoint is to be corrected by half a pixel to the upper right.

At step S650, a value equivalent to half a pixel length is added to the x-coordinate of the coordinates (x, y) of the endpoint of interest and a value equivalent to half a pixel length is subtracted from the y-coordinate. That is, the coordinate system described earlier is used, one pixel length is treated as "2" for convenience, and the following calculations are performed:

$$x \leftarrow x+1 \quad (5)$$

$$y \leftarrow y-1 \quad (6)$$

At step S660, the additional information associated with the endpoint of interest is checked to determine whether the endpoint is to be corrected by half a pixel to the lower right. If so, the process proceeds to step S670; otherwise, the sequence of the process steps will end and the process returns to the flowchart of FIG. 42. The determination for the additional information of the endpoint is made by checking the 3 LSB of the value in the column "Value" shown in FIGS. 10A and 10B (the 3 bits are indicated in the column "Direction of correction") to determine whether the 3 bits represent 4 ("100" in binary notation). If so, it indicates that the starting endpoint is one pixel in a 2-pixel×2-pixel core and it is determined that the endpoint is to be corrected by half a pixel to the lower right.

At step S670, a value equivalent to half a pixel length is added to the x-coordinate of the coordinates (x, y) of the endpoint of interest and a value equivalent to half a pixel length is added to the y-coordinate. That is, the coordinate system described earlier is used, one pixel length is treated as "2" for convenience, and the following calculations are performed:

$$x \leftarrow x+1 \quad (7)$$

$$y \leftarrow y+1 \quad (8)$$

The sequence of the process steps ends with the completion of the processing at step S670, and the process returns to the flowchart in FIG. 42.

As has been described above, according to the present embodiment, status information added to each point on contour includes information indicating whether the point is a pixel constituting a 2-pixel×2-pixel core. The coordinates of an endpoint obtained from a 2-pixel×2-pixel core portion is corrected to the coordinates of the position at the center point of the 2-pixel×2-pixel portion by the endpoint coordinate correcting unit. That is, the image processing apparatus according to the present embodiment corrects the vectors having an endpoint at 4 adjacent pixels in a pixel matrix shown in FIGS. 11 to 26 so that the endpoints are located at the same point (the center point of 2 pixels×2 pixels).

Consequently, according to the present embodiment, if a thinned binary image contains 4 pixels that remain as a 2-pixel×2-pixel core portion, a line in the portion can be output as a set of vector sequences whose endpoints are connected without being broken in the portion.

In the present embodiment, the data formats shown in FIGS. 30, 38A, and 38B are illustrative only and other formats may be used. For example, endpoint-to-endpoint smoothed (non-surround) vectors may be output in Scalable Vector Graphics (SVG) vector representation. Furthermore, the total numbers of contour points in vector sequences may be put together and a table section containing the total number of contour points and a section containing data on the vectors in vector sequences may be separately represented. That is, a section containing the total numbers of points on the first to a-th contours in FIG. 30 followed by a section containing contour point data on the first to a-th contours may be provided. Furthermore the closed-loop marker shown in FIG. 38A may take any other form that can distinguish vector sequences in which starting and ending endpoints exist.

In the present embodiment, the endpoint-to-endpoint-auxiliary-vector-containing (surround) vector smoothing unit may be implemented by a well-known method. The endpoint-to-endpoint-auxiliary-vector-containing (surround) vector smoothing unit may be applied to approximation using quadratic Bezier functions or smoothing of vectors approximated by collinear approximation as short vectors, for example.

In the present embodiment, a computer-readable program recording medium (also called storage medium) on which a software program code that implements functions of host and terminal devices is recorded may be provided to a system or an apparatus. In that case, a computer (or CPU or MPU) of the system or apparatus may read and execute the program code stored in the storage medium.

The program (image processing program) code itself read from the storage medium implements the functions of the present embodiment and the storage medium that stores the program code constitutes the present invention. The storage medium for providing the program code may be a ROM, a floppy (registered trademark) disk, a hard disk, an optical disk, a magneto-optical disk, a CD-ROM, a CD-R, a magnetic tape, a non-volatile memory card, or the like. The present invention includes implementations in which functions of the present embodiment are implemented by a computer reading and executing the program code as well as implementations in which an operating system running on a computer performs part or all of actual processing to implement the present embodiments in accordance with instructions of the program code.

The program code read from the storage medium can be written in a memory provided in an expansion board inserted in a computer or an expansion unit connected to a computer. Then, a CPU or the like provided in the expansion board or unit may perform part or all of actual processing in accordance with instructions of the program code and the processing implements functions of any of the present embodiments. The present invention also includes such implementation.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-289962, filed Nov. 7, 2007, which is hereby incorporated by reference herein in its entirety.

What is claimed is:

1. An image processing apparatus generating a thin line binary image and extracting vectors, comprising:
   a vector extracting unit configured to raster-scan the thin line binary image by using a pixel matrix including a plurality of pixels to extract a vector to which contour point information is added in accordance with a predetermined pattern of black and white pixels in the pixel matrix; and
   a coordinate correcting unit configured to detect that the vector has been extracted from a set of black pixels of 2 pixels×2 pixels in the pixel matrix by referring to the contour point information added to the vector and correct a coordinate of a core-line vector in accordance with coordinate correction information included in the contour point information, the core-line vector being produced by reducing the vector to a core line.

2. The image processing apparatus according to claim 1, wherein said coordinate correcting unit corrects a coordinates of the vector to the center point of a set of black pixels of the 2 pixels×2 pixels.

3. The image processing apparatus according to claim 1, wherein the pixel matrix includes 3 pixels×3 pixels.

4. The image processing apparatus according to claim 3, wherein the pattern is a set of the black and white pixels recognized from a 4-connected thin line binary image.

5. An image processing method for generating a thin line binary image and extracting vectors, comprising the steps of:
   raster-scanning the thin line binary image by using a pixel matrix including a plurality of pixels to extract a vector to which contour point information is added in accordance with a predetermined pattern of black and white pixels in the pixel matrix; and
   detecting that the vector has been extracted from a set of black pixels of 2 pixels×2 pixels in the pixel matrix by referring to the contour point information added to the vector and correcting a coordinate of a core-line vector in accordance with coordinate correction information included in the contour point information, the core-line vector being produced by reducing the vector to a core line.

6. A non-transitory computer-readable recording medium on which a program is recorded, said program causing a computer to function to:
   raster-scan the thin line binary image by using a pixel matrix including a plurality of pixels to extract a vector to which contour point information is added in accordance with a predetermined pattern of black and white pixels in the pixel matrix; and
   detect that the vector has been extracted from a set of black pixels of 2 pixels×2 pixels in the pixel matrix by referring to the contour point information added to the vector and correct a coordinate of a core-line vector in accordance with coordinate correction information included in the contour point information, the core-line vector being produced by reducing the vector to a core line.

7. An image processing apparatus generating a thin line binary image and extracting vectors, comprising:
   a vector extracting unit configured to extract a plurality of core-line vectors reduced to a core line from the thin line binary image; and
   a coordinate correcting unit configured to correct, when each of the plurality of extracted core-line vectors has an endpoint is a set of black pixels of 2 pixels×2 pixels, a coordinate of endpoint of each of the core-line vectors so that coordinates of endpoints of the core-line vectors are the same.

* * * * *